July 1, 1930. M. P. HOLMES 1,769,878
MINING MACHINE
Filed April 22, 1914 10 Sheets-Sheet 2

Witnesses:
Llewellyn Richards.
Carl R. Choate.

Inventor:
Morris P. Holmes
by Emery Booth Janney & Varney
Attys.

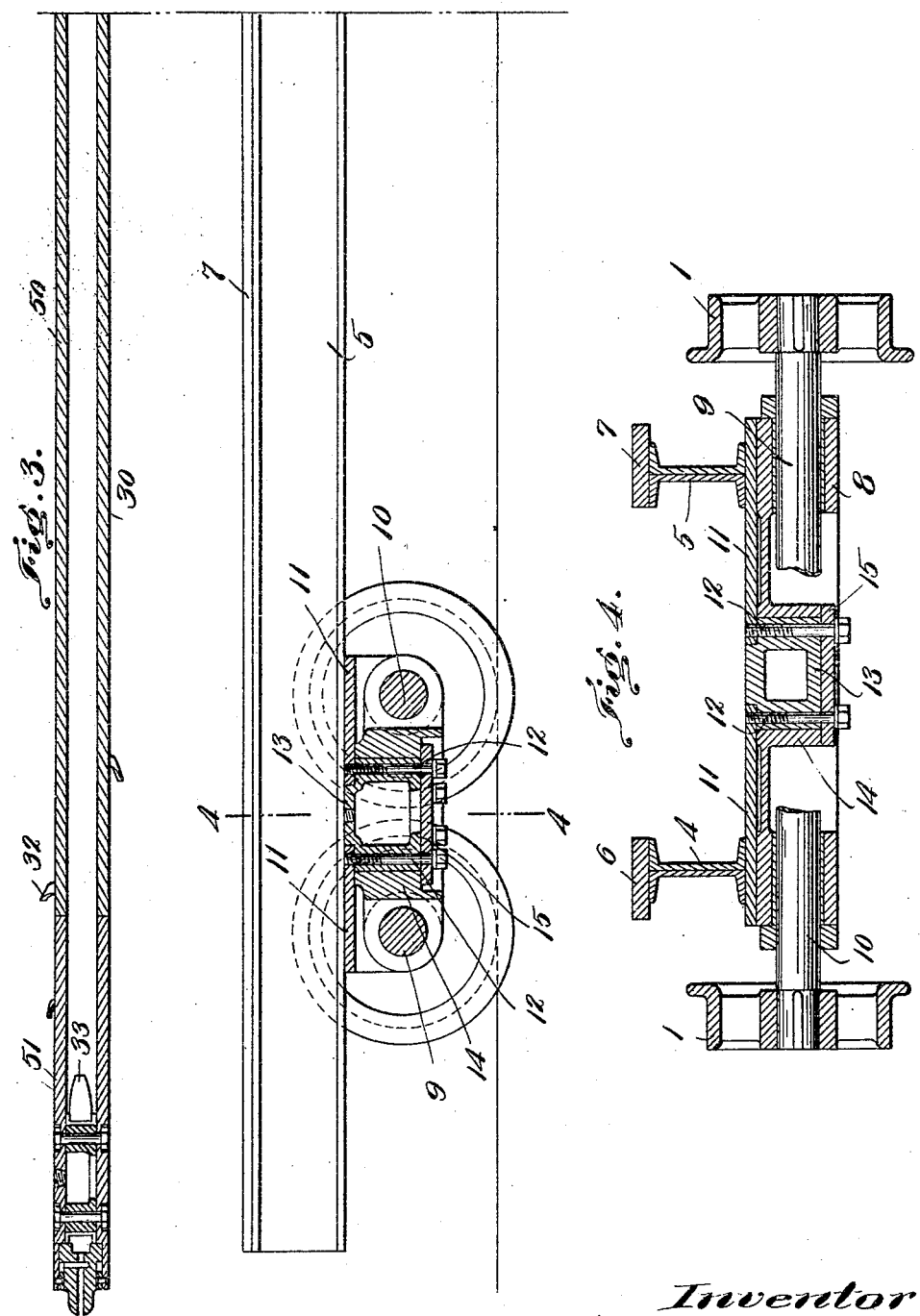

July 1, 1930. M. P. HOLMES 1,769,878
MINING MACHINE
Filed April 22, 1914 10 Sheets-Sheet 4
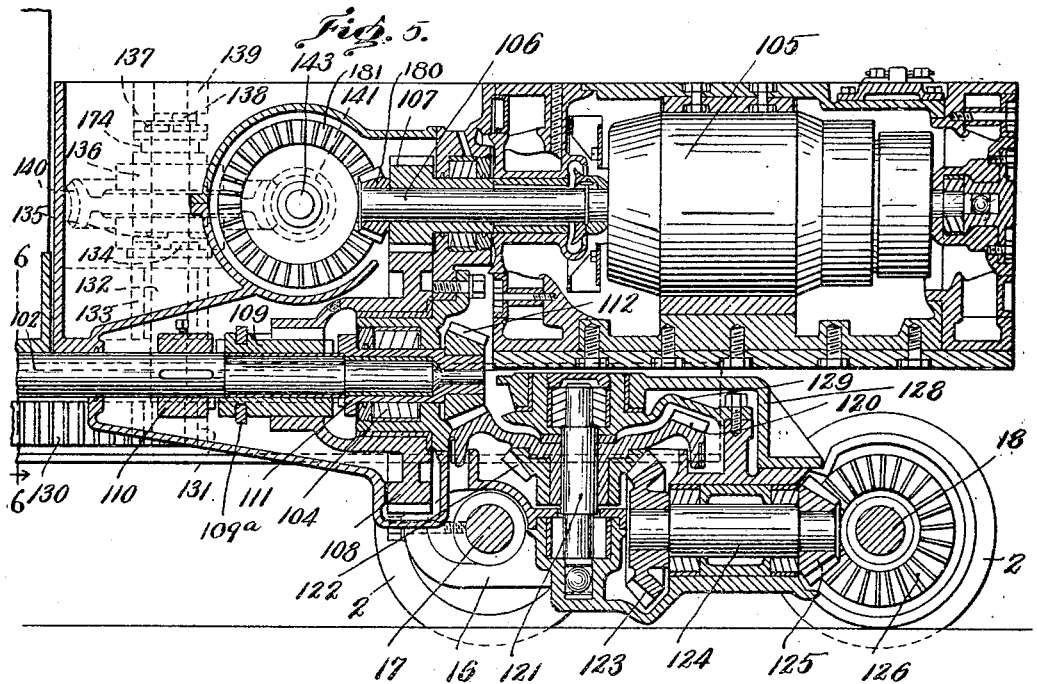
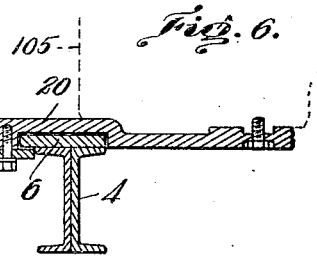
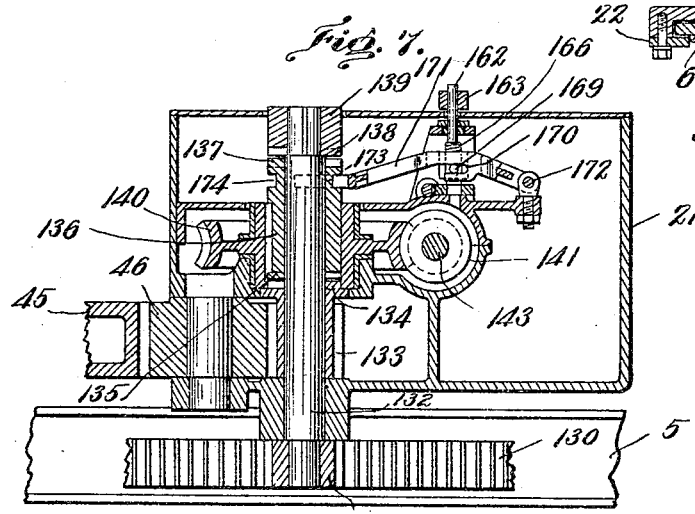
Witnesses:
Llewellyn Richards
Carl L. Choate.
Inventor
Morris P. Holmes
by Emery Booth Janney Varney
Attys.

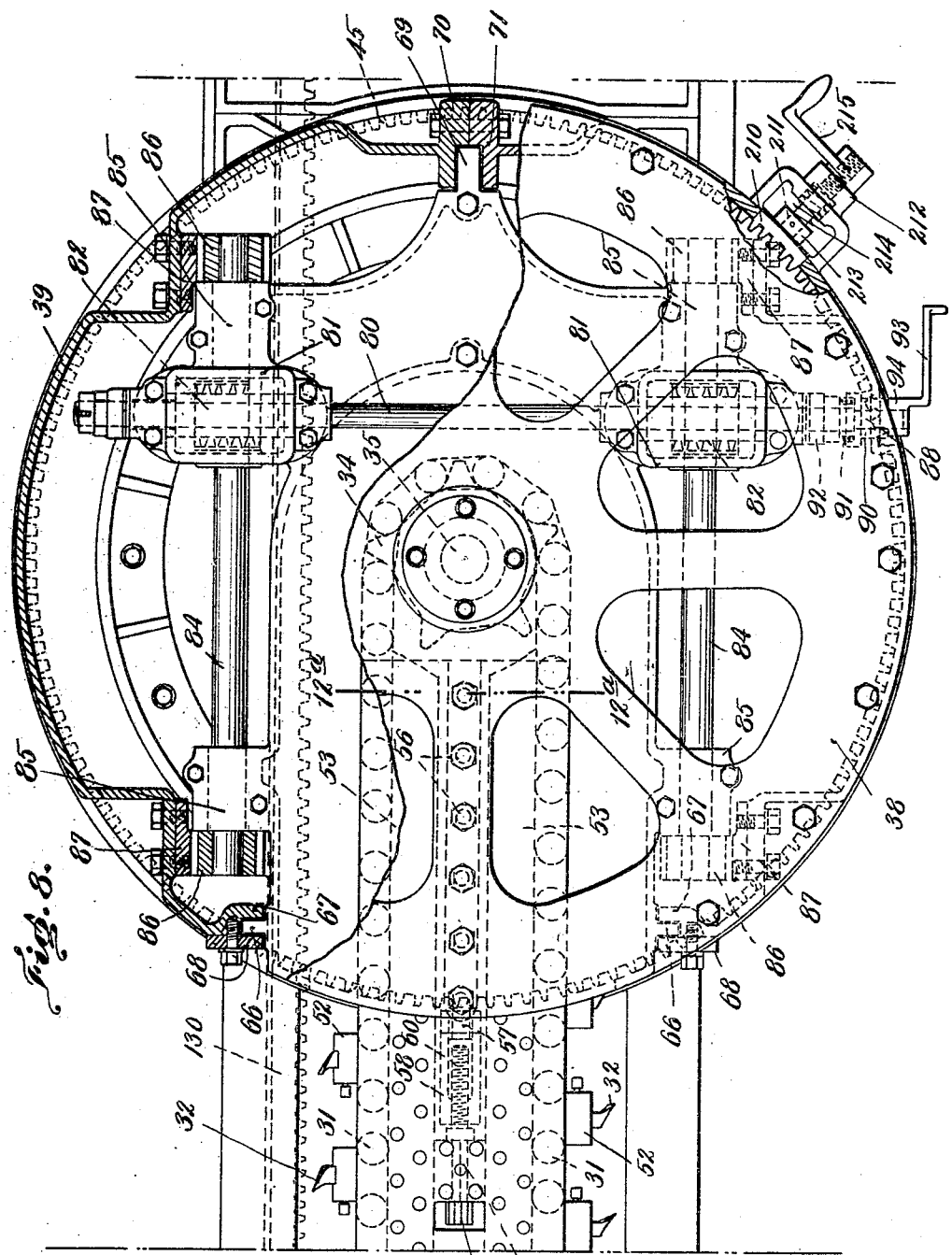

July 1, 1930. M. P. HOLMES 1,769,878
MINING MACHINE
Filed April 22, 1914 10 Sheets-Sheet 6
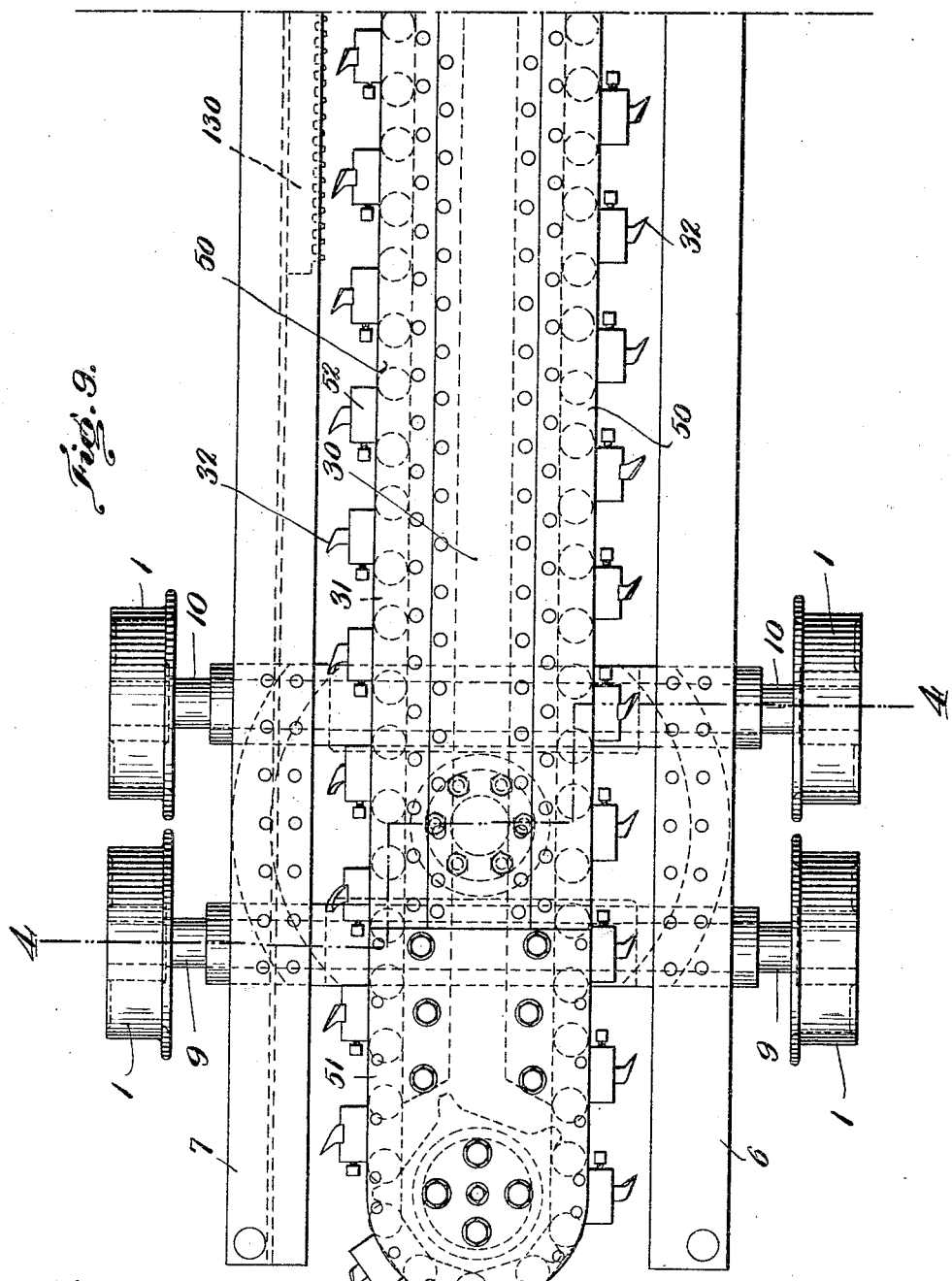

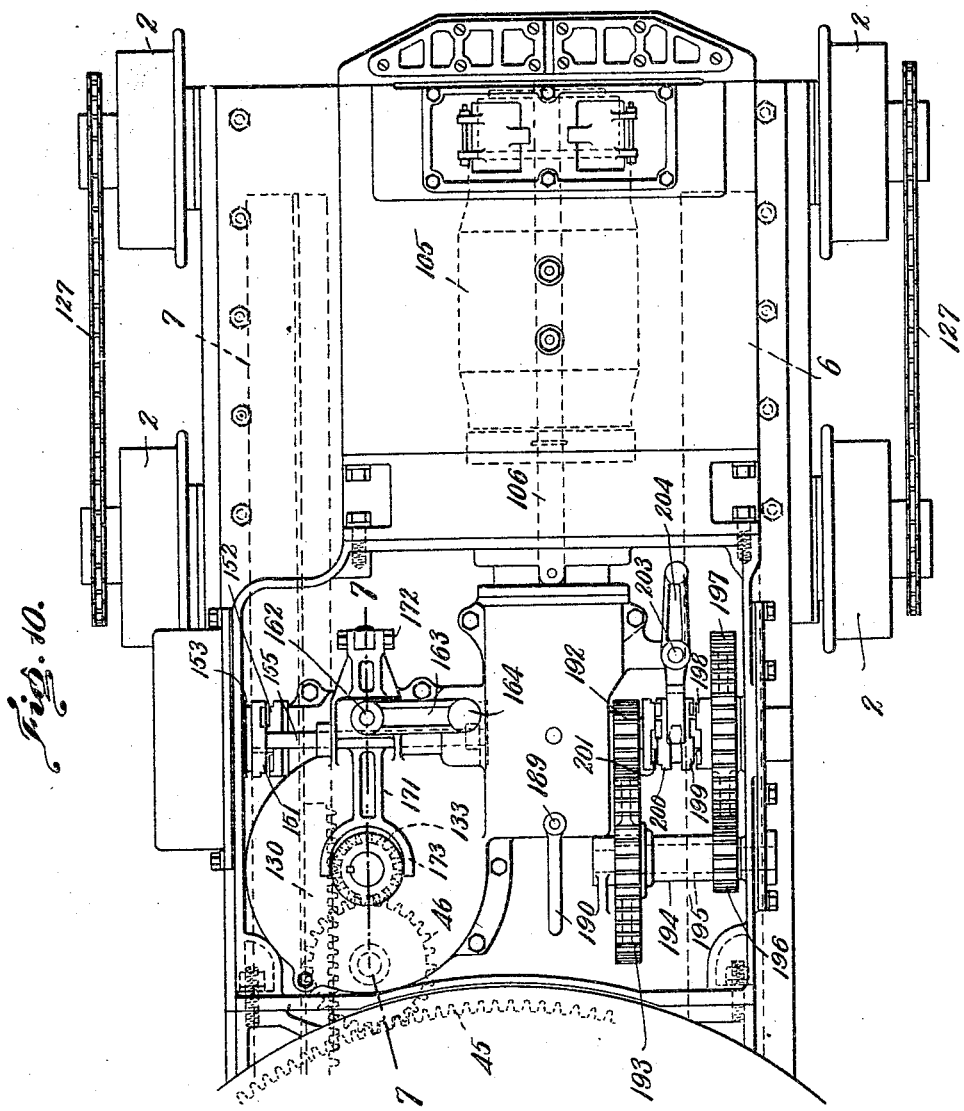

July 1, 1930.  M. P. HOLMES  1,769,878
MINING MACHINE
Filed April 22, 1914   10 Sheets-Sheet 8
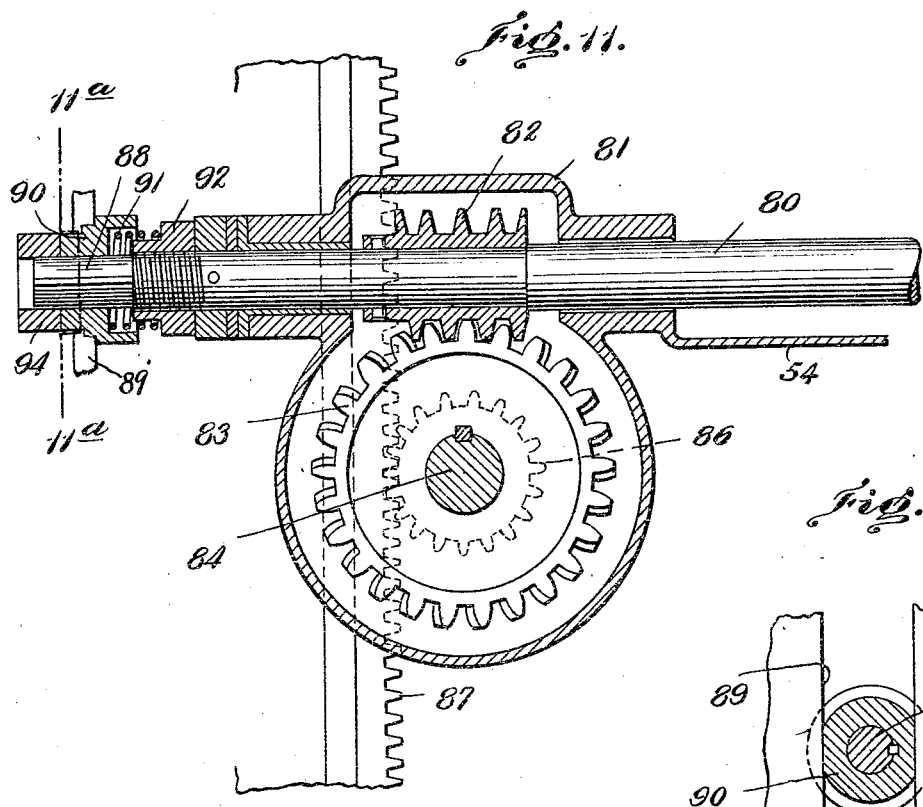
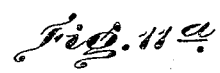
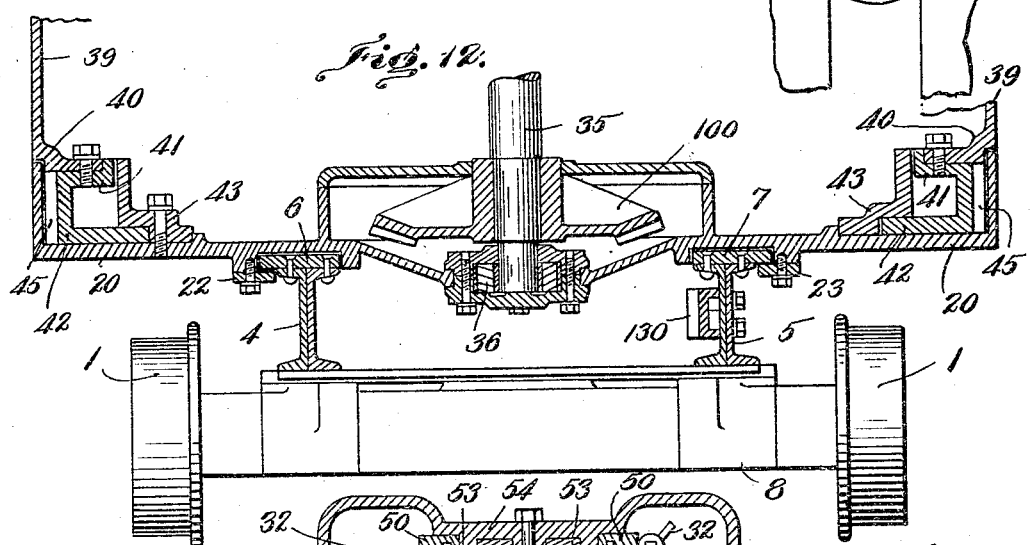
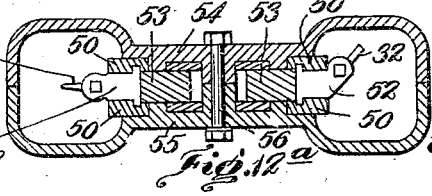

July 1, 1930.  M. P. HOLMES  1,769,878
MINING MACHINE
Filed April 22, 1914    10 Sheets-Sheet 9
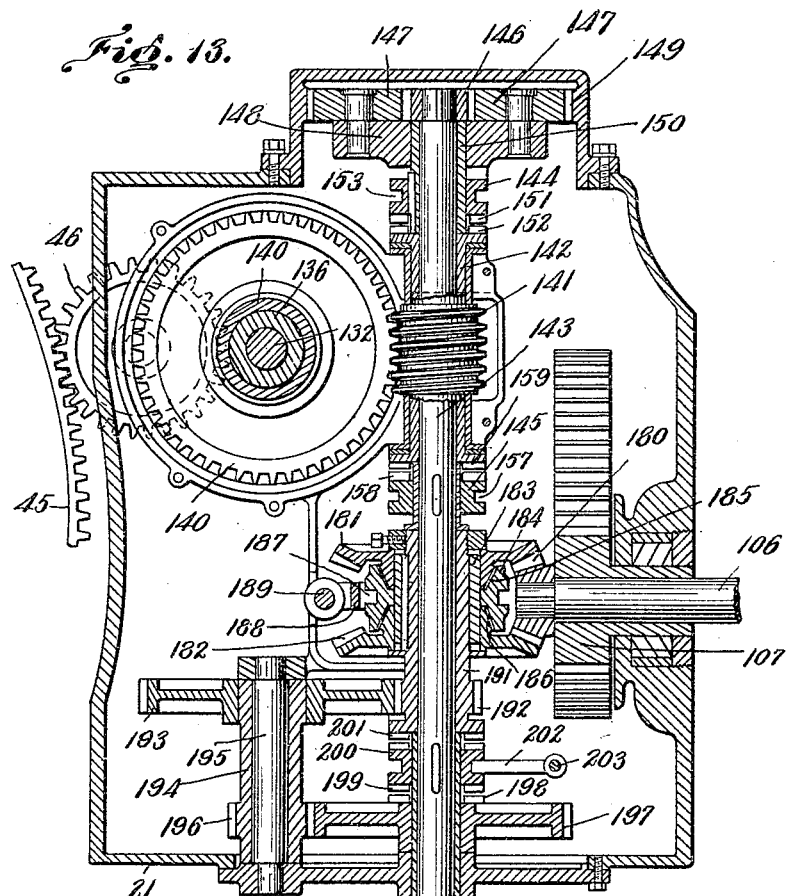
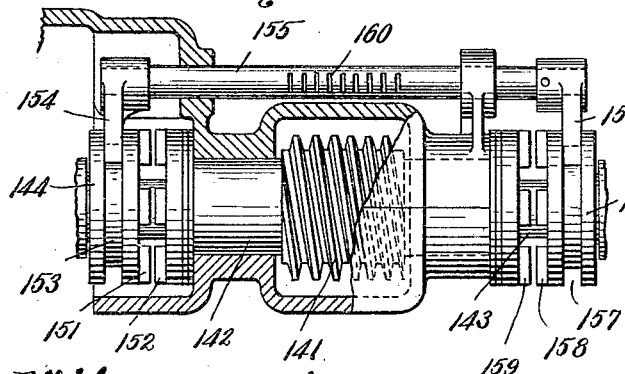
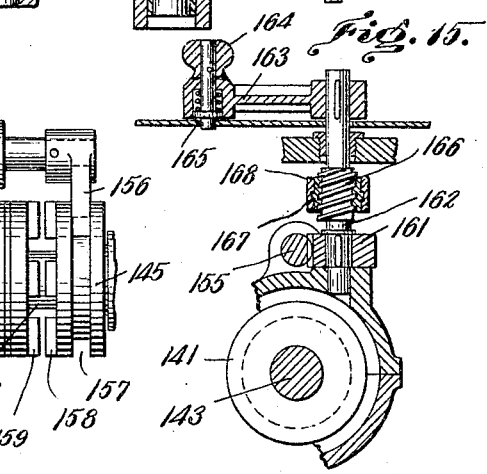

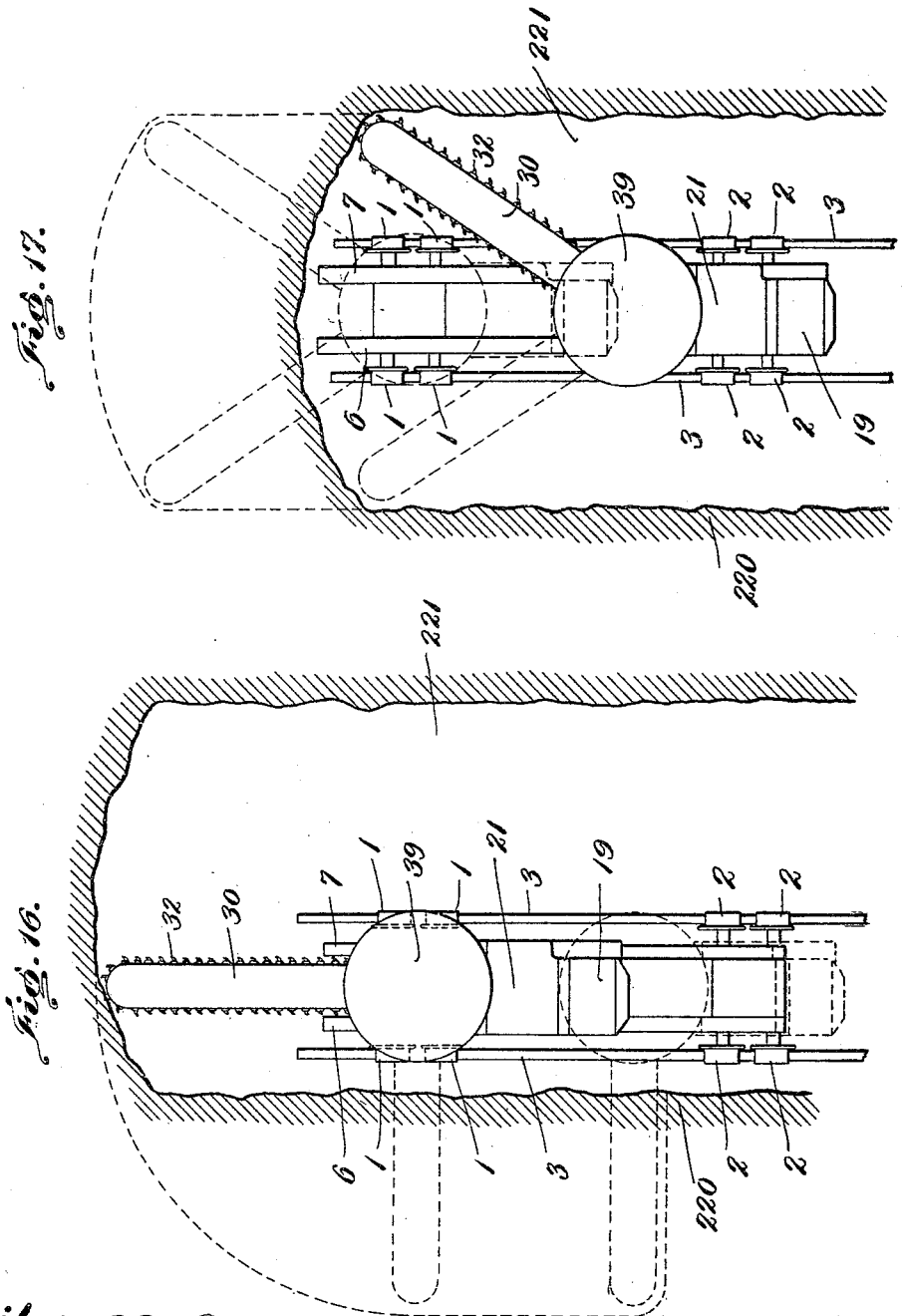

Patented July 1, 1930

1,769,878

UNITED STATES PATENT OFFICE

MORRIS P. HOLMES, OF CLAREMONT, NEW HAMPSHIRE, ASSIGNOR TO SULLIVAN MACHINERY COMPANY, OF CLAREMONT, NEW HAMPSHIRE, A CORPORATION OF MASSACHUSETTS

MINING MACHINE

Application filed April 22, 1914. Serial No. 833,782.

This invention relates to mining machines and more particularly, though not exclusively, to coal mining machines employing movable cutting devices adapted to be presented to the face of a mine to cut a kerf or channel therein. The purpose of the invention is to provide an improved mining apparatus. A further purpose of my invention is to provide a compact and efficient form of machine so arranged that a great variety of conditions may be met, and the cutter bar or support for the cutting appliances may be held in a variety of relations to the work, all with the loss of little or no time in adjusting or altering the relation of the machine as a whole to the work, thereby greatly increasing the speed and effectiveness of the cutting. A further purpose is to provide an improved, self-contained, power-operated mining machine operable, without the use of extraneously attached flexible connections, to insert in a face in advance of the machine cuts which include a transverse swinging cut and one or more rectilinear cuts—as: a sumping cut, a withdrawing cut, or both. Other objects and advantages will hereinafter more fully appear.

The invention will be best understood by reference to the following description, when taken in connection with the accompanying illustration of one specific embodiment thereof, while its scope will be more particularly pointed out in the appended claims.

In the drawings:

Fig. 3 is a section similar to that in Fig. 2, but showing the forward portion of the machine, this section constituting in effect an extension of the section shown in Fig. 2;

Fig. 4 is a transverse, sectional elevation in end view, taken on the broken line 4—4 in Fig. 9;

Fig. 5 is a central, longitudinal section in elevation taken through the rear portion of the machine and constituting in effect an extension of the section shown in Fig. 2, but showing also the motor and motor shaft in central longitudinal elevation;

Fig. 6 is a detail in transverse sectional elevation taken on the line 6—6 of Fig. 5;

Fig. 7 is a sectional elevation taken on the line 7—7 in Fig. 10, showing the mechanism for feeding the machine longitudinally on its bed;

Fig. 8 is a plan view in partial section of the central portion of the machine shown in Fig. 2;

Fig. 9 is a plan view of the forward portion of the machine shown in Fig. 3;

Fig. 10 is a plan view of the rear portion of the machine, or that shown in Fig. 5;

Fig. 11 is a transverse, sectional elevation on an enlarged scale, showing the devices for vertically adjusting the cutter bar;

Figure 1:
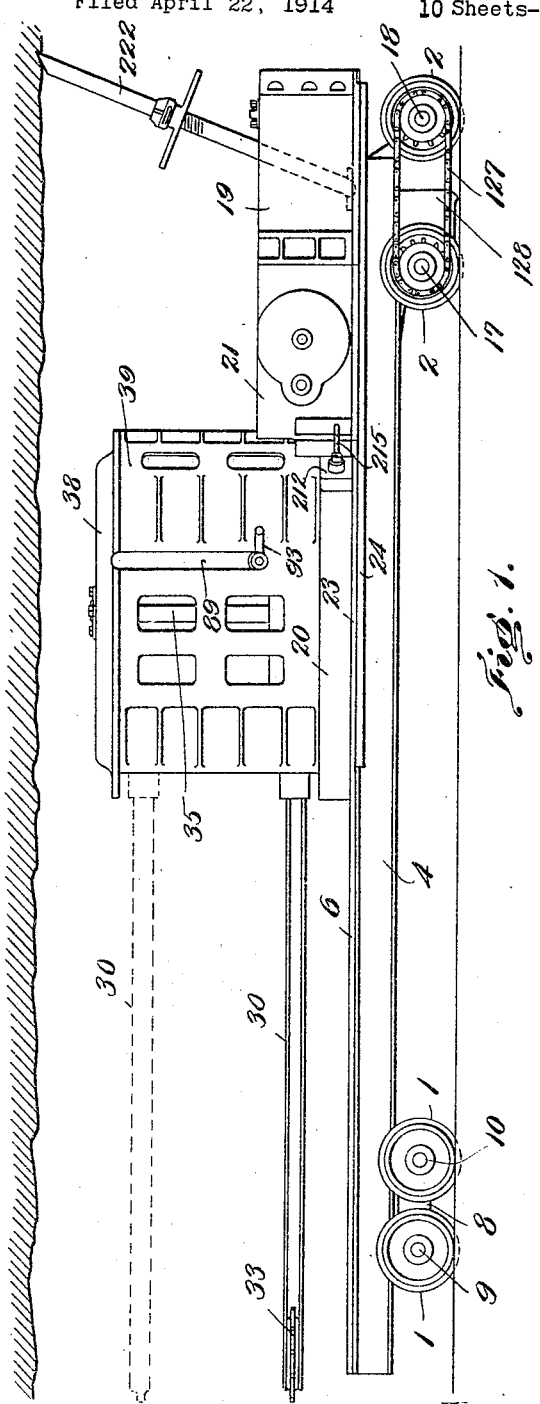
Fig. 1 is a side elevation of a mining machine embodying one form of the invention.
Figure 2:
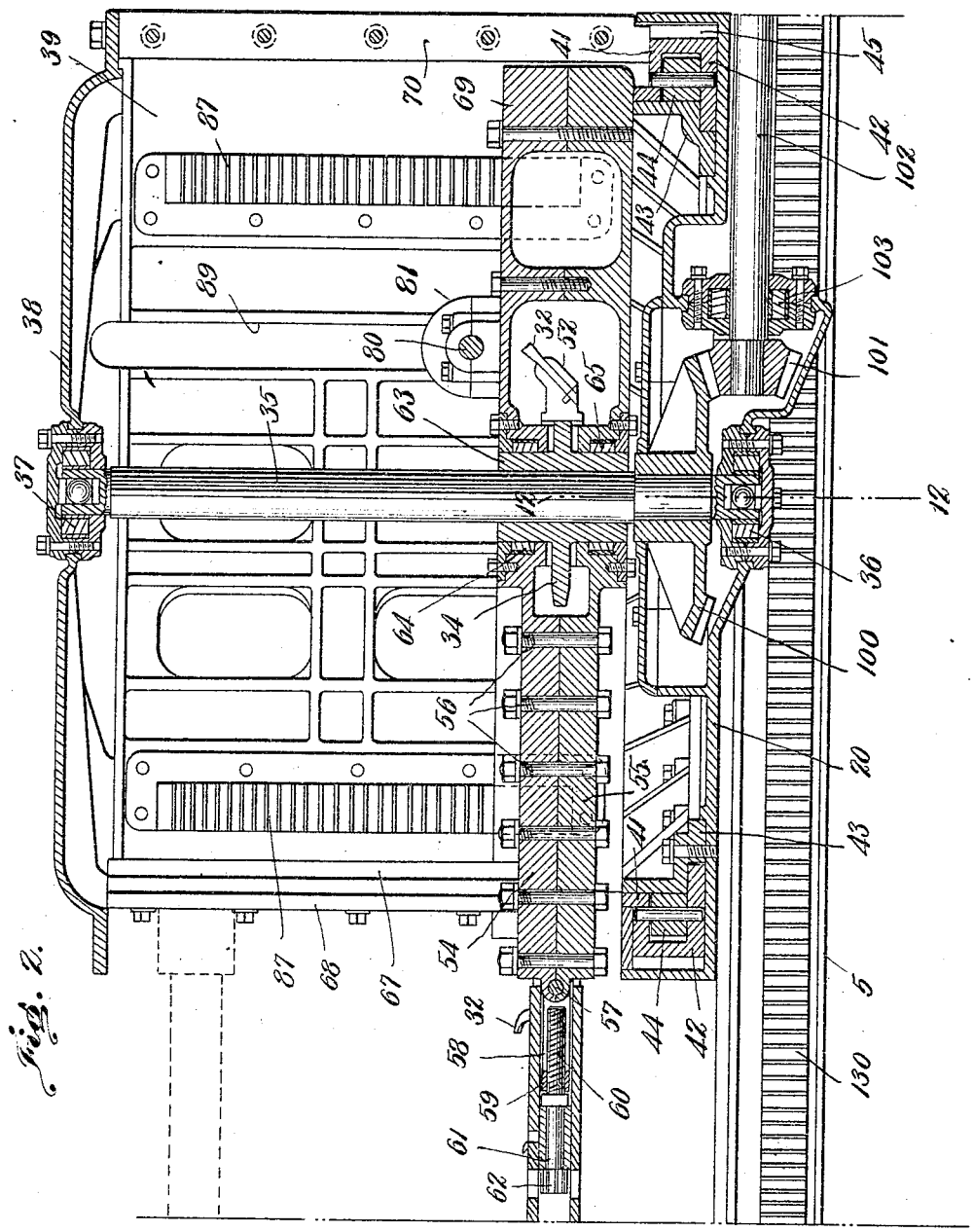
Fig. 2 is a central, longitudinal section in elevation of the central portion of the machine, including the turret or cutter bar support.

Fig. 11$^a$ is a sectional elevation, taken on the line 11$^a$—11$^a$ in Fig. 11;

Fig. 12 is a transverse, sectional elevation taken through the center of the turret on the line 12—12 in Fig. 2;

Fig. 12$^a$ is a transverse sectional elevation, taken through the cutter bar and its carrier, on the line 12$^a$—12$^a$ in Fig. 8;

Fig. 13 is a section in plan on a somewhat enlarged scale showing the transmission gearing located between the motor and the turret;

Fig. 14 is an enlarged detail in partial section showing the driving worm and clutches at one end of the transmission shaft;

Fig. 15 shows in enlarged, longitudinal section a detail of the clutch operating devices;

Fig. 16 is a plan view diagrammatic in form showing one method of using the machine shown in Fig. 1; and Fig. 17 is a similar view in plan showing another method of utilizing the machine.

Referring to the drawings, and to the embodiment of my invention which is therein shown for illustrative purposes, the same comprises a mining machine mounted upon a main portable support, herein in the form of a bed carried by forward and rear sets of truck wheels 1—1 and 2—2, respectively. The latter are adapted to track upon rails of a suitable trackway indicated at 3—3 (Figs.

16 and 17), which latter is laid adjacent the coal face or rib to be cut either parallel with the same or at right angles thereto, or in any other desired relation, as conditions may require.

The main support or bed for the machine is herein composed of longitudinal supporting bars 4 and 5 (Fig. 4), the latter extending the full length of the machine and in the form of double channels fastened together and providing each a beam of I cross section, presenting a flat top, to which is secured (Figs. 4, 6 and 12), as by rivets, the flat guide plates 6 and 7, on which the machine frame rests and along which it is adapted to have a sliding movement, as is later described.

At their forward ends, the supporting beams 4 and 5 rest upon a suitable truck frame 8 journaled on the axles 9 and 10. To permit the forward portion of the bed to swivel on the truck frame 8, the beams 4 and 5 are supported directly on a turntable or plate 11 (Figs. 3, 4 and 9) secured, as by the bolts 12, to the hub piece 13 adapted to turn about a vertical axis in the bearing box 14, the latter carried by the truck frame 8. The hub piece 13 is held fixed in its bearing by the cap plate 15 secured thereto by the bolts 12. At its rear end, the machine bed is also supported for swiveling movement upon a truck frame 16, the latter carried by the axles 17 and 18. The rear truck frame 16 also serves as a housing and carrier for truck propelling gearing (Fig. 5) which is hereinafter more fully described.

The machine frame carrying the principal working parts and which is adapted to have a longitudinal sliding movement along the bed is composed of the motor casing 19 at the rear thereof, the turret supporting plate 20 near the forward end and an intermediate casing 21 carrying the principal transmission gear parts. These three members are bolted rigidly together to form a continuous machine frame and are provided on their under faces each with guideways which fit the guide plates 6 and 7 (Figs. 6 and 12). At each side, the frame is also provided with the continuous gib plates 22 and 23, (Fig. 12) which underlie the outside edge of the adjacent guide plates 6 or 7, so that the entire machine frame is accurately guided as a unit to travel longitudinally of the bed.

In the present type of machine, the machine frame is adapted to be traversed under power back or forth on the bed while the cutting appliances are being operated. The cutter bar with its turret may also be turned under power in either direction, and the cutter bar may be caused to project laterally from either side of the machine frame, while the latter is being longitudinally moved. It is also possible to effect these movements of the cutting appliances with the latter adjusted to different heights and this vertical adjustment of the cutting appliances may be effected with but little loss of time. By the location of the cutter bar above the frame it is possible effectively to utilize the cutting appliances while swinging the latter across the end of the machine.

Referring first to the cutting appliances and the support therefor, I have herein illustrated my invention as applied to a machine of the chain cutter type. This is provided with a cutter bar 30 of common and usual construction carrying the cutter chain 31 provided with the cutter-like bits 32, the chain passing about the guiding sprocket wheel 33 journaled in the forward end of the cutter bar and also about the driving sprocket wheel 34, the latter mounted on the sprocket wheel driving shaft 35 (Fig. 2). Since the cutter bar is capable of vertical adjustment, the sprocket wheel 34 is splined on the drive shaft 35, the latter being journaled in lower bearings 36 carried by the turret plate 20 and upper bearings 37 carried in the cap plate 38 of the turret 39. The turret 39 (with the cutter bar, as will be later described) rests upon and is revoluble in the turret plate 20 (see Figs. 2, 8 and 12). For this purpose, the bottom of the turret is provided with a flange 40 (see Fig. 12), to which is bolted the upper face 41 of the annular bearing ring 42, the latter resting and turning directly upon the upper face of the turret plate 20. An annular flanged centering and guide plate 43 bolted to the turret plate 20 overlies the bottom flange of the bearing plate 42 and holds the same in position. Friction is prevented laterally by the rollers 44 carried by the bearing plate 42 and engaging the periphery of the flanged plate 43 (see Fig. 2).

To turn the turret within its bearing seat thus provided by the turret plate 20, the external face of the bearing plate 42 is provided with gear teeth 45 which mesh with a driving pinion 46 (Figs. 7 and 10), the latter adapted to be driven through suitably controlled power transmission devices, hereinafter described, so that the turret, carrying with it the cutter bar, may be rotated at will through any required angle or to any desired position.

Herein the vertical adjustment of the cutting appliances is provided with relation to the turret itself and the other large and heavy parts of the machine, so that when vertical adjustment is required, the relatively light cutter bar only need be raised or lowered, the vertical position of the turret, motor and other heavy parts of the machine being left unchanged. To provide for the vertical adjustment of the cutter bar with relation to the turret while at the same time holding the former in fixed relation to the latter to partake of its turning movement as required, an intermediate frame or carriage is herein provided in which the rear end of the cutter bar is rigidly seated, means being provided for the vertical adjustment at will of the carriage in suitable guideways in the turret.

Referring to Figs. 2, 8, 9 and 12ª, the cutter bar 30 is of ordinary or usual construction, being provided with side gib plates 50 and end gib plates 51, which form guideways for the cutter blocks 52. At its rear or inner end, the cutter bar has the two bifurcated members 53 (Figs. 12ª and 8), which seat between the upper and lower plates 54 and 55, respectively, of the vertically adjustable cutter bar carrier, the bifurcated ends of the cutter bar being securely clamped and positioned as shown in Figs. 2 and 12ª by means of the clamping bolts 56. To tighten the chain, the cutter bar is longitudinally adjustable in the forward end of the carrier (Figs. 2 and 8), there being provided for this purpose an eye 57 fixed on the carrier on which is swivelled a link 58, the forward end of which is formed into the threaded sleeve 59, the latter engaging with the adjusting screw 60 longitudinally fixed with relation to a part 61 carried by the cutter bar. The screw 60 is provided with a head 62 accessible through an opening in the cutter bar, so that when the clamping bolts 56 are loosened, the screw may be turned and the cutter bar adjusted with reference to its carrier and driving sprocket wheel.

The driving sprocket wheel 34 is mounted upon a sleeve 63 journaled in upper and lower bearings 64 and 65, the latter being provided in the upper and lower carrier plates 54 and 55, respectively (see Figs. 2 and 12).

To turn the carrier with the turret while permitting its vertical adjustment with relation thereto, the cutter bar carrier plates are provided (Fig. 8) at each side with laterally projecting, vertically disposed guiding ribs 66, similar in construction. These engage with corresponding guideways formed in the turret by the finished faces of the flanges 67 and the overlying gib plates 68 bolted thereto. At its rear, the carrier is similarly guided by means of the rib plates 69 formed upon the rear of the carrier plates, these being guided between the opposing faces of a finished guideway formed in the adjacent walls 70 and 71 of the turret housing. The latter is shown as formed in two parts separable along a longitudinal center line, each bolted to the other and to the bearing ring 42, as represented in Figs. 8 and 12. The vertical guideways described extend from the top to the bottom of the turret so that the carrier may be adjusted from the lowermost position of the cutter bar (represented in full lines in Fig. 2) to the uppermost (represented in dotted lines in Fig. 2), being maintained in all positions of vertical adjustment rotatably immovable with relation to the turret. The front of the turret is open between the gib plates 68 to permit the vertical movement of the cutter bar carrier therein.

Any suitable means, either motor driven or hand operated may be employed for raising or lowering the cutter bar carrier. Herein the weight of the vertically adjustable parts is so slight that a hand adjustment may be effectively employed. To this end, a transversely arranged hand-rotated shaft 80 is journaled in bearing boxes 81 (Figs. 2, 8 and 11) carried by the upper carrier plate 54 for the cutter bar. This shaft has fixed thereon a pair of worms 82, 82, one located directly at each side of the carrier plate and meshing each with an underlying worm gear 83. The worm gears are secured each to a longitudinal shaft 84 which is carried in bearings 85 at the side of the carrier plate. The two shafts 84, 84 have fixed at each end thereof a pinion 86, each of the four pinions meshing with the teeth of the vertically arranged and fixed racks 87—87, the racks being bolted to an appropriately shaped adjacent wall of the turret (Figs. 2 and 8).

The pinions 86, shafts 84, worm gears and worms being rotatably mounted upon and carried by the cutter bar carrier, the latter may be raised or lowered in the turret within its limits of adjustment by merely turning the shaft 80.

To turn the shaft 80 (Figs. 8, 11 and 11ª), the latter has a reduced end 88 projecting through the turret, the latter having an elongated vertical slot 89 therein (Figs. 1 and 11ª) to permit the vertical movement of the shaft end 88. On the reduced end 88 of the shaft 80 a sliding sleeve 90 is mounted having an outwardly projecting end with slabbed off sides which fit the slot 89 in the turret. The sleeve is splined to the shaft end 88, and is normally pressed out into interlocking engagement with the slotted walls of the turret by the spring 91, the latter interposed between the sleeve and a collar 92 fixed on the shaft 80. In this position of the sleeve, the shaft is locked against turning, thereby adding to the locking effect of the worm gear 83 and worm 82, also the locking effect of the sleeve 90 in opposition to any tendency of the cutter bar carrier to displace vertically. When it is desired to turn the shaft, a crank handle 93 (Fig. 8) having the hub 94 is applied to the end of the shaft. The hub is also splined to fit the key on the reduced end of the shaft. By pressing the handle inwardly, the sleeve is forced in to release the shaft, whereupon the handle may be turned to turn the shaft 80, thereby raising or lowering the cutter bar.

To turn the driving sprocket wheel 34 in all vertical positions of the cutter bar and in all angular positions of the turret, driving movement is transmitted to the sprocket 34 through the splined driving shaft 35 by means of the beveled driven gear 100 fixed to the lower end of the said shaft and meshing with the beveled driving pinion 101, the latter keyed to the forward end of the longitudinal cutter-chain driving shaft 102 (Figs. 2 and 5). The latter shaft is carried in the machine frame so as to travel forward and back with the same upon the bed, being journaled at its forward end in bearings 103 carried by the turret plate 20 and at its rear end in bearings 104 which are supported by the transmission gear casing 21.

To turn the shaft 102 and supply power for the other movements of the machine, a driving motor 105 is utilized mounted upon the motor frame casing 19. The motor may be of any suitable type, but herein the same is an electric motor of the reversible type usual in mining machines (Fig. 5) having the armature shaft 106 carried in bearings supported by the casing 19, there being secured to the armature shaft near its forward end the driving pinion 107 meshing with the large driving gear 108, the latter arranged concentric with the axis of the cutter chain driving shaft 102. The gear 108 is splined to the sliding clutch sleeve 109 freely rotatable on the shaft 102, the sleeve having clutch teeth on one side adapted to engage with similar clutch teeth on the member 110 fixed to the shaft 102. At its opposite end, it has similar clutch teeth adapted to be engaged with and drive a sleeved member 111 mounted for free rotation upon the end of the shaft 102 and carrying at its end the beveled driving gear 112. A clutch lever 109$^a$ may be utilized to move the clutch sleeve 109 longitudinally. In one position, it engages with the chain driving member 110 and causes motor driven movement of the shaft 102. If moved in the opposite direction, it engages the truck driving member 111 and drives the gear 112 while turning loosely about the shaft 102. Or, it may be left in an intermediate position, as shown, when both the shaft 102 and the gear 112 are disconnected from the driving motor.

The gear 112 is employed to propel the truck and for that purpose engages with a beveled gear 120, the latter mounted to turn with the shaft 121 in bearings carried by the truck frame 16. A beveled pinion 122 is provided to turn with the gear 120 and meshes with the beveled drive gear 123, the latter upon a horizontal shaft 124 which carries a beveled pinion 125 meshing with the beveled gear 126 secured to the rear axle 18. Sprocket driving chains 127 (Figs. 1 and 10) impart driving movement from the rear axle 18 to the forward axle 17 of the rear truck. When the clutch sleeve 109 is moved to its rearward position, the motor is utilized to propel the truck through the mechanism described.

The channel irons 4 and 5 are supported upon the plate 128 which has a swiveled support upon the casing 129, the latter fixed upon the truck frame so that the bed is capable of turning upon the rear truck, the location of the beveled gears 112 and 120 with relation to the turning axis being such that this turning movement is permitted without interrupting the driving connection.

It will be observed that when the machine frame feeds forwardly upon the bed, the motor, transmission gearing and cutter chain driving shaft 102 all travel with the same, the beveled gear 112 carried by the shaft 102 withdrawing from engagement with the beveled gear 120 on the truck and leaving the latter, together with the remainder of the propelling gearing, on the truck in fixed position. On the return movement of the machine frame, or when it becomes necessary to propel the truck, the machine frame is moved back to bring the gears 112 and 120 into mesh.

To feed the machine frame forward and back on the bed, the latter is provided with a stationary rack 130, fixed to the inside of the beam 5 (Figs. 2, 5, 7 and 10). Meshing with the teeth of this rack is a pinion 131, the latter fixed to and driven by the lower end of the short upright shaft 132, journaled in bearings carried by the gear casing 21 (Fig. 7). Mounted to turn loosely on the shaft 132, is the small pinion 133, meshing with the gear 46, which turns the turret. The top face of the pinion 133 is provided with clutch teeth 134, adapted to co-act with the clutch teeth 135 on the lower face of the sliding clutch member 136. The upper face of the clutch member is provided with clutch teeth 137, co-acting with clutch teeth 138 on the lower face of the collar 139, the latter fixed on the shaft 132. The clutch member 136 is non-rotatably fixed but longitudinally slidable in the hub of a worm driving gear 140, so that, with the clutch sleeve fitted into toothed engagement with the collar 139, the gear 140 serves to turn the pinion 131 and feed the machine on its bed in one direction or the other. When forced into toothed engagement with the pinion 133, however, it serves to drive the gear 46 and turn the turret in one direction or the other, as the case may be.

To turn the gear 140, the latter is caused to mesh with the driving worm 141 (Figs. 13, 14 and 15) carried by the worm-sleeve 142, the latter mounted to turn loosely about the main transmission shaft 143, which is transversely arranged in the gear casing 21. By means of the connected, but reversely movable, clutch sleeves 144 and 145, the worm sleeve may be clutched to be driven directly from the transmission shaft 143, or may be connected to be driven at a slower speed through planetary speed reduction gearing at the end of the shaft.

The speed reduction gearing comprises a driving pinion 146 secured to the end of the shaft, meshing with intermediate planetary pinions 147 journaled on the planetary member 148, the latter freely rotatable about the shaft 143. The pinions 147 mesh with the teeth 149 of an internal gear fixed to the casing 21. The planetary member 148 has a sleeve 150 keyed thereto, and on the sleeve is splined the clutch member 144, having clutch teeth 151 adapted to interlock with clutch teeth 152 on the opposing face of the worm sleeve 142.

The clutch sleeve 144 (Fig. 14) has a circumferential groove 153, engaged by the forked arm 154 carried by the sliding rod 155. At its opposite end, the latter carries a similar forked arm 156 engaging a circumferential groove 157 on the clutch sleeve 145. The latter is splined to the shaft 143, and has clutch teeth 158 adapted to interlock with clutch teeth 159 on the adjacent face of the worm sleeve 142. By moving the slide rod, the clutch sleeves may be simultaneously and reversely moved, so that the worm sleeve may be clutched directly to the transmission shaft 143 by the clutch sleeve 145, or be driven at a reduced speed through the clutch sleeve 144 and planetary driving member 148, or be disengaged entirely from the transmission shaft by leaving the clutch sleeves at an intermediate position.

To move the slide rod, the latter has rack teeth 160 formed in its side meshing with the teeth of a pinion 161 (Figs. 14 and 15), the latter secured to the bottom of a small upright shaft 162, provided with a crank arm 163 exterior to the casing. A handle 164 of the crank arm is provided with a spring-pressed positioning pin 165 adapted to enter any one of three holes in the casing, so as to position the crank arm for the high speed, the low speed, or the disengaged position of the clutch sleeves.

The reduced speed through the planetary gearing is intended to be used when the cutter bar, with its cutters in motion, is fed against the work by means of the rotary movement of the turret. The higher speed obtained through the direct connection to the transmission shaft is intended to be used when the cutter bar, with the cutters in motion, is fed toward the work by means of the bodily or longitudinal movement of the machine frame along the bed. As an assistance to the operator, I have herein provided means whereby on the one hand the clutch sleeves may be thrown to give the reduced speed to the worm sleeve simultaneously with the downward movement of the clutch sleeve 136 on the shaft 132 which downward movement serves to clutch in the turning gear 46, and whereby on the other hand the said clutch sleeves may be oppositely thrown to give the higher speed simultaneously with the upward movement of the clutch sleeve 136 which clutches in the longitudinal feed gear 131.

For this purpose (see Figs. 7 and 15) the upright shaft 162 carries above the pinion 161 a screw or threaded portion 166. This engages a nut 167, the latter fixed in a sleeve 168 provided with laterally projecting pins 169, the latter working in a sleeve 170 formed in the clutch operating lever 171 (Figs. 7, 10 and 15). The latter is pivoted at 172, and has the forked or bifurcated end 173, which engages a groove 174 in the clutch sleeve 136. The connections are such that in one position of the lever arm 163, all the clutch sleeves 144, 145 and 136 are disengaged. In another position, the clutch sleeve 145 is connected to the worm sleeve 142, turning the worm 140 at its higher rate of speed, and the clutch sleeve 136 is elevated through the clutch lever 171, transmitting this high speed driving movement to the longitudinal feed pinion 131. In the other position of the lever arm, the clutch sleeve 144 is connected to the worm sleeve to turn the worm 140 at the slower rate of speed, and this movement is transmitted to the turret-turning pinion 46 by the depression of the clutch sleeve 136 through the lever 171.

The transmission shaft 143 is driven from the motor shaft 106 through a beveled driving pinion 180 carried at its end, and preferably through speed change devices whereby, for movements of adjustment, a higher speed can be attained both for the longitudinal movement of the machine frame and for the turning movement of the turret, than is had when such parts are moved with the cutters at work, thereby saving time in bringing the cutter bar back from or up to cutting position. To this end, the beveled pinion 180 is caused to mesh with the two beveled gears 181 and 182 (Fig. 13), the latter being thereby driven in opposite directions upon the hub 183 of the clutch device 184. The latter is provided with friction faces 185 and 186, adapted to engage with opposed friction faces carried by the respective gears 181 and 182, the clutch sleeve 183 being longitudinally slidable, whereby it may be clutched through the described clutch faces with either the gear 181 or 182, or maintained at an intermediate position, disconnected from both.

To throw the clutch 184, the latter has the circumferential groove 187 engaged by the forked lever arm 188, the latter connected to the upright clutch shaft 189 having the external clutch operating lever 190 (Fig. 10) located outside the casing. The clutch sleeve 183, which is thus rotatable at will in either direction, is keyed to the inner sleeve 191, the latter carrying a pinion 192, meshing with a gear 193 carried by a sleeve 194 rotatable on a countershaft 195. Secured to turn with the sleeve 194 is the smaller pinion 196, meshing with the large gear 197, the latter freely rotatable about the transmission shaft 143.

The inner face of the gear 197 is provided with clutch teeth 198 adapted to mesh with clutch teeth 199 on the sleeve 200, and the opposite face of the latter is provided with similar clutch teeth adapted to engage with clutch teeth 201 on the end of the elongated sleeve 191. The clutch sleeve 200, therefore, may be moved in one direction to clutch the driving sleeve 191 directly to the transmission shaft 143, and turn the same at the higher rate of speed, or may be moved to clutch the shaft directly to the gear 197 and cause the former to be driven at the reduced speed through the speed reduction gears 192, 193, 196 and 197. To move the clutch sleeve 200 in either direction, or hold the same in an unclutched, intermediate position, a circumferential groove in the sleeve is engaged by the forked arm 202, carried by the clutch shaft 203, the latter having the external clutch operating lever 204 (Fig. 10).

It will be seen that through the three clutch levers 163, 190 and 204, the required longitudinal or turning feed in either direction, and at either a high or low rate of speed may be readily had. The clutch lever 163 will give either a high speed longitudinal feeding movement of the machine frame, or a relatively low speed turning movement of the turret. The clutch lever 204 may be turned to provide these movements at an accelerated speed when they are performed with the cutters doing no work. To provide different cutting speeds, gears of different sizes may be substituted for the gears 196 and 197. The reversing lever 190 is used to reverse the direction of feed either of the turret or the frame.

To hold the cutter bar and turret fixed in any desired position of adjustment when the turret turning feed is not employed, a small segmental toothed plate 210 (Fig. 8) is employed, which is adapted to mesh and interlock with teeth of the turning gear 45. The segmental lock is held fixed in the turret ring casing, except for a limited longitudinal sliding movement, so that the same may be withdrawn from mesh with the gear, allowing the latter to rotate, or may be forced into mesh therewith to prevent rotation of the gear and the turret. For this purpose, the segment is carried upon the end of a short shaft 211, the latter guided for sliding movement in a bracket 212 carried by the turret plate. Interposed between the bracket 212 and a collar 213 carried by the shaft is a coiled spring 214 tending normally to press the segment into interlocking mesh with the gear. The projecting end of the shaft 214 is threaded, and has engagement with the internally threaded hub of the crank arm 215. By turning the latter right-handedly, the locking segment is withdrawn and held withdrawn from engagement with the gear. A reverse movement of the crank handle, however, permits the spring to force the toothed plate inwardly and securely locks the gear against turning.

The described form of machine may be used for a great variety of purposes. The specific embodiment herein shown has particular application to the cutting of kerfs at variable heights between the floor and the roof of the mine. This is often required where a dirt seam extends across the face or rib of the coal near the roof, or intermediate the roof and the floor, and it becomes necessary to cut out or to remove this seam before the coal is broken down, or where for any other reason a kerf is required between the floor and the roof.

Two conditions of use are represented in the drawings (Figs. 16 and 17), these being merely illustrative and the machine in its application not being limited to these specific uses.

In Fig. 16 is shown the method of utilizing the machine for rib cutting. Under these conditions, the trackway is laid parallel with and closely adjacent the rib 220 close to the end of the entry 221.

The machine with its cutter bar held projecting forwardly and parallel with the bed is then propelled under its own power along the trackway to the position indicated in the said figure. In this position the bed and the trucks are held fixed by any suitable clamping means such as a jack post similar to the jack post 222 represented in Fig. 1. The longitudinal feed is then thrown in to move the machine frame into the full line position shown in Fig. 16, the lever 204 being turned to avail of the high speed feeding movement, thereby avoiding loss of time in the initial positioning of the machine. With the machine in the full line position shown, the longitudinal feed is thrown out and the lever 163 moved to throw in the turret turning feed to swing the cutter bar against the rib, the turret being first unclamped by turning the turret releasing lever 215. This brings the cutter bar against the work and the cutter bar is then caused gradually to cut itself through the arc indicated to a right angle position such as is indicated in dotted lines in Fig. 16. During cutting the lever 204 is positioned to give the slow or cutting feed. While the cutter bar is cutting on the arc with the machine frame fixed, the machine frame itself may be clamped as by a jack post similar to the post 222 in Fig. 1. With the circular or swinging cutting completed the turret is again clamped and the reverse longitudinal feed of the machine frame is thrown in by reversing the position of the lever 163 and the lever 190, this moving the machine frame from the full line position shown in Fig. 16 to the dotted line position therein shown, and causing the cutting in a continuous, straight kerf. The kerf may be continued down the side of the rib by suitably longitudinally moving the bar relative thereto, herein by shifting the position of the truck from time to time.

At any time, as may be required to suit the particular conditions met with, the vertical location of the kerf in the face or in the rib may be changed by quickly and easily adjusting the cutter bar to different heights by the adjusting lever 93.

In Fig. 17 I have illustrated the application of the machine to entry cutting. Herein the track is laid upon the bottom of the mine near the mid portion of the entry and the machine is brought up on the trackway with the forward end of its bed projecting beyond the trackway to a point adjacent to the face of the coal. With the cutter bar laterally and forwardly inclined so that the cutters reach to the side wall of the entry and with the turret held fixed in that position, the longitudinal feed is thrown in to cause the machine frame to move forward from the full line position shown to the dotted line position, thereby carrying the cut into the face and in advance of the machine along a line constituting an extension of the side wall, this being shown in plan in Fig. 17. With the frame fed to the forward limit of its movement upon the bed the machine frame is then clamped in position, the turret unclamped and the turret feed thrown in with the slow cutting movement, this serving to swing the end of the cutter bar through an arc from the forward right hand dotted line position to the left hand position shown in Fig. 17, the cutter bar being thereby swung to the opposite side of the machine while the machine frame is simultaneously held fixed upon its bed. With the cutter bar clamped in its reverse inclined position the reverse longitudinal feed is thrown in and the machine frame caused to feed back upon the bed again to the full line position shown, bringing the cutter bar to the rearward left hand dotted-line position shown in Fig. 17, thereby completing the entry cut. It will be observed that this entry cut which contemplates cutting both sides of the entry along straight lines, that is to say, straight rib cuts, is performed without readjustment of the machine and by what amounts to one continuous cutting movement of the cutting appliances. It will also be observed that the overhanging front end of the truck overcomes one of the defects now present in entry driving mechanisms, that is, that the movement of the cutting mechanism is limited to the end of the trackway, which usually is spaced some distance from the entry face. The present construction makes it possible to cut a kerf to the full depth of the bar, even though the trackway is not laid up to the face to be cut. It should also be observed that though the guiding means projects beyond the front wheels, the wheels are spaced far enough apart to distribute the weight of the truck and guiding apparatus over a substantial length of the track to prevent breakage of the trackway because of the great weight of the entry cutting apparatus.

All the cutting movements of the cutter bar are performed through the power transmission devices connected with the motor and traveling with the machine during its movement. The vertical adjustment of the cutting appliances can be performed without disturbing the position or relation of the other working parts of the machine and this permits the truck propelling devices to be employed in any vertical position of the cutting appliances. No delays are required in loading or unloading the machine at the place of work or in setting it up for adjustment or readjustment. All the parts are self-contained upon the machine, which greatly adds to the speed of cutting. By causing the machine to feed longitudinally on the long, firmly held bed, an accurately aligned feeding base is provided and an accurate cut can always be made, it being unnecessary to level up the trackway to provide level, rigid guiding means.

Attention is also directed to the fact that my improved construction is readily adapted to room cutting, the apparatus during that operation being used substantially as in entry cutting, with the track disposed at right angles to the face. It will also be evident that certain features of my invention, such, for instance, as the longitudinally and angularly movable bar, the improved means for feeding the mechanism or the bar relative to the track or truck, or the improved cooperating truck driving mechanism, may be advantageously embodied either alone or in combination in various forms in ordinary room and pillar or other trucks, or longwall cutters, entry cutters, or room cutters without departing from the spirit of my invention, it being my intention to include all such adaptations of these or other features of my improved construction within the scope of the appended claims.

While for purposes of illustration I have herein shown and described one specific embodiment of the invention it is to be understood that the same is not limited to the constructional details and parts or their relative arrangement herein specifically indicated, but that extensive deviations may be made from the described embodiment without departing from the spirit of the invention, and that many features herein described in combination may be usefully employed independently or in other connections than in the relations they occupy in the described type of machine.

Claims:

1. In a mining apparatus, a wheeled truck movable on a trackway, cutter mechanism thereon comprising a motor and a pivotally mounted cutter bar, power operated mechanism for moving said bar angularly across the end of said truck in opposite directions at different speeds comprising separate trains of transmission mechanism, and yieldable friction mechanism controlling said trains.

2. In a mining machine, the combination with a swinging cutter bar mounted to swing across and in advance of the end of the machine, of a motor and means operated thereby for effecting swinging movements of said cutter bar, and separate means engageable with a portion of said first mentioned means for holding said cutter bar against movement.

3. In a mining apparatus, a wheeled truck movable on a trackway, cutter mechanism thereon comprising a motor and a pivotally mounted cutter bar, power operated gearing for moving said cutter bar across the end of said truck in opposite directions at different speeds, and means for releasing said cutter bar for free swing, said mechanism including clutch means operative per se and simply on actuation to effect variation in direction of bar movement.

4. In a mining apparatus, a wheeled truck movable on a trackway, cutter mechanism thereon comprising a motor and a pivotally mounted cutter bar, power operated gearing for moving said cutter bar angularly across the end of said truck in either direction at either of a plurality of speeds, and means for releasing said cutter bar for free swing, said mechanism including clutch means operative per se and simply on actuation to effect variation in direction of bar movement.

5. In a mining apparatus, a support, a cutter bar pivotally mounted thereon for swinging movement relative thereto, and means for swinging said bar and for holding it in different angular positions including gearing a portion of which is self-locking, and means between said bar and the self-locking portion of said gearing for freeing the bar from the control of said gearing to permit free swinging of the bar.

6. In a mining apparatus, a support, a cutter bar pivotally mounted thereon for swinging movement relative thereto, and means for swinging said bar in opposite directions at different speeds and for holding it in different angular positions including gearing a portion of which is self-locking, and means between said bar and the self-locking portion of said gearing for freeing the bar from the control of said gearing to permit free swing of the bar.

7. In a mining apparatus, a support, a cutter bar pivotally mounted thereon for swinging movement relative thereto, and means for swinging said bar and for holding it in different angular positions including a worm and a worm wheel, said worm rotatable to effect bar swing, and means for operatively connecting and disconnecting said worm wheel and said bar releasing said bar for free swing when disconnection is effected.

8. In a mining apparatus, a support, a cutter bar pivotally mounted thereon for swinging movement relative thereto, and means for swinging said bar in either direction at a cutting or at a higher speed and for holding it in different angular positions including a worm and a worm wheel, said worm rotatable to effect bar swing, and means for operatively connecting and disconnecting said worm wheel and said bar releasing said bar for free swing when disconnection is effected.

9. In a mining apparatus, a support, a cutter bar pivotally mounted thereon for swinging movement relative thereto, and means for swinging said bar and for holding it in different angular positions including a rotatable element, means cooperating therewith to drive the same when rotating and to lock the same when stationary, and controlling means for effecting operative connection between said element and said bar whereby the latter may be positively swung, and disconnection of said element from said bar whereby the latter may be free for swinging.

10. In a mining apparatus, a support, a cutter bar pivotally mounted thereon for swinging movement relative thereto, and means for swinging said bar in opposite directions at different speeds and for holding it in different angular positions including a rotatable element, means cooperating therewith to drive the same when rotating and to lock the same when stationary, and controlling means for effecting operative connection between said element and said bar whereby the latter may be positively swung, and disconnection of said element from said bar whereby the latter may be free for swinging.

11. In a mining apparatus, a pivotally mounted cutter bar, a support upon which said cutter bar is mounted for swinging movement about its pivot, and means for swinging said bar and for holding it in different angular positions, including gearing a portion of which is self-locking and which includes reversing mechanism, and means between said bar and the self-locking portion of said gearing for freeing the bar from the control of said gearing to permit free swinging of the bar.

12. In a mining apparatus, a support, a cutter bar pivotally mounted thereon for swinging movement relative thereto, means for swinging said bar including a worm wheel rotating on an axis perpendicular to the plane of bar swing, a worm meshing therewith, reversing gearing including a pair of oppositely rotating coaxial gears arranged on an axis parallel to a line parallel to the axis of said worm, and means for selectively driving said worm from one or the other of said coaxial gears.

13. In a mining apparatus, a support, a cutter bar pivotally mounted thereon for swinging movement relative thereto, and means for swinging said bar and for holding it in different angular positions including gearing a portion of which is self-locking, said gearing including a worm rotating on an axis in a plane substantially parallel to the plane of bar swing, and means for driving said worm in opposite directions including reversely rotating gear elements coaxially arranged on an axis parallel to a line parallel to the axis of rotation of said worm and selectively operative as driving elements, and means between said bar and the self-locking portion of said gearing for freeing the bar from the control of said gearing to permit free swinging of the bar.

14. In a mining apparatus, a support, a cutter bar pivotally mounted thereon for swinging movement relative thereto, and means for swinging said bar and for holding it in different angular positions including gearing a portion of which is self-locking, said gearing including a worm rotating on an axis in a plane parallel to the plane of bar swing, and means for driving said worm in opposite directions including reversely rotating gear elements coaxially arranged on an axis parallel to a line parallel to the axis of rotation of said worm, and a driving pinion for said gear elements rotating on an axis perpendicular to their axis and meshing with both of said gear elements.

15. Mining apparatus including a frame, cutting mechanism carried thereby including a pivoted cutter bar projecting from said frame and adapted to be swung across the front end of said frame, a motor on said frame, and separate gear trains separately actuated by said motor for respectively actuating said cutting mechanism and directly effecting swinging of said bar relative to said frame.

16. In a mining apparatus, a machine frame, a projecting cutter chain carrying cutter bar, and chain shrouding means affording a chain passage in which said chain is wholly enclosed during its traverse thereof.

17. In a mining machine, the combination with machine feeding mechanism including a plurality of clutches, one of which is a main feed controlling clutch, of controlling means for said clutches including a common controlling element.

18. In a mining machine, a feed operating shaft, a plurality of driving members concentric therewith and spaced apart thereon, a sleeve on said shaft, means for connecting said sleeve to said shaft or disconnecting it therefrom, means for selectively connecting said driving members to said sleeve, and a feed operating member driven by said shaft.

19. In a mining machine, a feed operating shaft, a plurality of driving members therefor concentric therewith, a sleeve on said shaft, means for connecting said sleeve to said shaft and disconnecting it therefrom, and means for selectively connecting said driving members to said sleeve.

20. In a mining machine, cutting mechanism, driving means therefor, means for moving said cutting mechanism, and controlling means for said moving means determining the speed of the latter and precluding driving of the cutting mechanism by its driving means at certain speeds of said moving means.

21. In a mining machine, a motor, cutting mechanism driven thereby, means for effecting translatory movement of the machine driven by said motor including a fast feed drive, and means for automatically interrupting operation of said cutting mechanism when said fast feed drive is effective.

22. In a mining apparatus, a machine comprising cutting mechanism, a motor spaced from said cutting mechanism but actuating the same, and mechanism for effecting feeding movement of said machine during cutting and movement at a higher speed disposed in a transverse zone between said cutting mechanism and said motor.

23. In a mining apparatus, a machine comprising an elongated cutter carrying bar at the front end thereof operative to cut a kerf for itself when presented edgewise or endwise to the work, a motor at the other end thereof, and mechanism disposed in a transverse zone between said cutting mechanism and said motor for moving said machine forwardly to effect a sumping cut at a predetermined cutting speed and for moving said machine at a higher speed.

24. In a mining apparatus, a machine comprising cutting mechanism including a cutter chain driving sprocket and a motor spaced from said cutting mechanism and actuating the same, and feeding mechanism for effecting movement of said machine during cutting disposed in a transverse zone between the axis of said cutter chain driving sprocket and the motor, and means for actuating said feeding and cutting mechanisms including coaxial driving elements supported on a common shaft.

25. In a mining apparatus, a machine comprising cutting mechanism, a motor spaced from said cutting mechanism but actuating the same, and feeding mechanism for effecting movement of said machine during cutting disposed in a transverse zone between said cutting mechanism and said motor, and means for actuating said feeding and cutting mechanisms including coaxial driving elements supported on a common shaft, said feeding mechanism including a transversely extending shaft having planetary gearing coaxial therewith and clutch means reciprocable longitudinally of said shaft to effect a change in speed.

26. In a mining apparatus, a machine comprising cutting mechanism, a motor spaced from said cutting mechanism but actuating the same, and feeding mechanism for effecting movement of said machine during cutting disposed in a transverse zone between said cutting mechanism and said motor, and means for actuating said feeding and cutting mechanisms including coaxial driving elements supported on a common shaft, said feeding mechanism including a transversely extending shaft having planetary gearing coaxial therewith.

27. In a mining apparatus, a machine comprising cutting mechanism, a motor spaced from said cutting mechanism but actuating the same, and feeding mechanism for effecting movement of said machine during cutting and at a higher speed disposed in a transverse zone between said cutting mechanism and said motor, and means for actuating said feeding and cutting mechanisms including coaxial driving elements respectively for said feeding and cutting mechanisms supported on a common shaft extending longitudinally of said machine.

28. In a mining apparatus, a truck having running gear, a mining machine on said truck, said machine comprising cutting mechanism including a cutter bar, a motor, and feeding mechanism for moving said cutter bar in a direction at right angles to its major dimension, said motor having a power shaft provided with a driving element actuating said feeding mechanism, and means whereby said machine also may propel said truck comprising a driving element on said machine coaxial with said power shaft.

29. In a mining apparatus, a frame movable longitudinally during cutting, a motor thereon having a longitudinally extending armature shaft, a pinion thereon, cutting mechanism at the opposite end of said frame driven by said pinion, a second power transmitting driving element on said shaft more remote from said motor than said pinion, and plural speed gear reduction mechanism actuated thereby for effecting feeding of said frame.

30. In a mining apparatus, a frame movable longitudinally during cutting, a motor thereon having a longitudinally extending armature shaft, a pinion thereon, cutting mechanism at the opposite end of said frame driven by said pinion and comprising a cutter bar swingable freely or held in fixed positions at the will of an operator, a second power transmitting driving element on said shaft more remote from said motor than said pinion, and plural speed gear reduction mechanism actuated thereby for effecting feeding of said frame.

31. In a mining apparatus, a frame movable longitudinally during cutting, a motor on said frame having a longitudinally extending armature shaft, a track, wheeled means for supporting said frame for movement over said track, a swinging cutter bar on said frame, means for driving certain of said wheels and actuating said bar driven by said armature shaft, and means for effecting feeding while said wheel drive is interrupted including plural predetermined speed gearing driven by said armature shaft beyond its connection with said wheel drive.

32. In a mining apparatus, a frame movable longitudinally during cutting, a motor on said frame having a longitudinally extending armature shaft, a track, wheeled means for supporting said frame for movement over said track, a swinging cutter bar on said frame, means for driving certain of said wheels and actuating said bar driven by said armature shaft, and means for effecting feeding while said wheel drive is interrupted including reversible plural predetermined speed gearing driven by said armature shaft beyond its connection with said wheel drive.

33. In a mining apparatus, cutting mechanism including a pivoted cutter bar mounted to swing across and in advance of the apparatus, feeding mechanism, and a motor for actuating both said cutting and said feeding mechanisms, said motor having a longitudinally extending power shaft having affixed thereto spaced driving elements respectively constituting actuating elements for said cutting and feeding mechanisms, and said feeding mechanism including a feed operating member and means for effecting rotation thereof in opposite directions at different predetermined speeds.

34. In a mining machine, a machine frame, cutting mechanism supported thereby including a pivoted cutter bar provided with a circulating cutter chain, a motor on said frame whose axis of rotation extends longitudinally of said frame, said motor having a plurality of driving pinions, operative connections between one of said driving pinions and said cutter chain, and feeding means operable by a different driving pinion including a member rotatable upon a vertical axis to effect feeding movement of said frame, and means driven by said motor for effecting rotation of said member including worm gearing comprising a worm rotating on a horizontal axis, and change speed gearing for effecting rotation of said worm at different speeds in the same direction including a plurality of gears coaxial with said worm and selectively adapted to constitute driving elements therefor.

35. In a mining machine, a machine frame, cutting mechanism supported thereby including a pivoted cutter bar provided with a circulating cutter chain, a motor on said frame whose axis of rotation extends longitudinally of said frame, said motor having a plurality of driving pinions, operative connections between one of said driving pinions and said cutter chain, and feeding means operable by a different driving pinion including a member rotatable upon a vertical axis to effect feeding movement of said frame, and means driven by said motor for effecting rotation of said member including worm gearing comprising a worm rotating on a horizontal axis, a plurality of gears coaxial with said worm and selectively adapted to constitute driving elements therefor, means for effecting rotation of one of said gears by power from said motor, means for connecting said gears whereby said motor driven gear may drive said other gear at a different speed in the same direction, and clutch means for selectively connecting either of said gears in driving relation to said worm.

36. Mining apparatus including a frame, cutting mechanism carried thereby including a cutter bar projecting from said frame, a motor on said frame having an armature shaft, a plurality of driving pinions on said armature shaft adjacent one end of the latter, actuating means for said cutting mechanism operatively connected to one of said pinions, and means for effecting feeding of said frame actuated by the other of said pinions and including an element rotatable on a vertical axis and cooperating with a stationary element, an extremity of which it approaches, to effect feeding.

37. Mining apparatus including a frame, cutting mechanism carried thereby including a pivoted cutter bar projecting from said frame, a motor on said frame having an armature shaft, a plurality of driving pinions on said armature shaft adjacent one end of the latter, actuating means for said cutting mechanism operatively connected to the one of said pinions nearer the motor, and means for swinging said bar relative to said frame actuated by the other of said pinions.

38. Mining apparatus including a frame, cutting mechanism carried thereby including a pivoted cutter bar projecting from said frame, a motor on said frame having an armature shaft, a plurality of driving pinions on said armature shaft adjacent one end of the latter, actuating means for said cutting mechanism operatively connected to one of said pinions, and means actuated by said other pinion for effecting swinging of said bar relative to said frame and feeding of said frame during cutting, said feeding means including an element rotatable on a vertical axis and cooperating with a stationary element, an extremity of which it approaches, to effect feeding.

39. Mining apparatus including a frame, cutting mechanism carried thereby including a cutter bar projecting from said frame, and means for effecting movement of said frame during cutting and for effecting propulsion thereof about a mine upon a wheeled truck respectively including a member rotatable to effect feed during cutting, a member adapted for operative connection with truck wheels and separate driving means for said members including separate trains, and a motor having an armature shaft provided with separate pinions respectively driving said trains.

40. In a mining apparatus, cutting mechanism, feeding mechanism, and a motor for actuating both said cutting and said feeding mechanisms, said cutting mechanism and said feeding mechanism being independently driven from said motor, and said feeding mechanism including a member rotatable on a vertical axis and operative on rotation to effect feed during cutting, change speed driving gearing therefor, and reversing mechanism between said change speed gearing and said motor, said member and said reversing gearing being at the same end of said motor.

41. In a mining apparatus, cutting mechanism, feeding mechanism, and a motor for actuating both said cutting and said feeding mechanisms, said cutting mechanism and said feeding mechanism being independently driven from the motor, and said feeding mechanism including a member operative on rotation to effect feed during cutting, plural predetermined speed driving gearing for said member, and reversing mechanism between said plural predetermined speed driving gearing and said motor, said member and said reversing gearing being at the same end of said motor.

42. In a mining apparatus, cutting mechanism, feeding mechanism, and a motor for actuating both said cutting and said feeding mechanisms, said cutting mechanism and said feeding mechanism being independently driven from said motor, and said feeding mechanism including a member operative on rotation to effect feed during cutting, change speed driving gearing therefor operative to effect drive thereof in different directions at different speeds, and reversing mechanism between said change speed gearing and said motor, said member and said reversing gearing being at the same end of said motor.

43. In a mining apparatus, cutting mechanism, feeding mechanism, and a motor for actuating both said cutting and said feeding mechanisms, said cutting mechanism and said feeding mechanism being independently driven from said motor, and said feeding mechanism including a member rotatable on a vertical axis and operative on rotation to effect feed during cutting, change speed driving gearing therefor operative to effect drive thereof in different directions at different speeds, and reversing mechanism between said change speed gearing and said motor, said member and said reversing gearing being at the same end of said motor.

44. In a mining apparatus, cutting mechanism, feeding mechanism, and a motor for actuating both said cutting and said feeding mechanisms, said cutting mechanism and said feeding mechanism being independently driven from said motor and said feeding mechanism including a member operative on rotation to effect feed during cutting, plural predetermined speed driving gearing therefor, and reverse gearing distinct from said plural predetermined speed driving gearing interposed between the latter and the motor, said member and said entire reversing gearing being at the same end of said motor.

45. In a mining apparatus, cutting mechanism, feeding mechanism, and a motor for actuating both said cutting and said feeding mechanisms, said cutting mechanism and said feeding mechanism being independently driven from said motor and said feeding mechanism including a member operative on rotation to effect feed during cutting, change speed driving gearing therefor operative to effect drive thereof in different directions at different speeds, and reverse gearing distinct from said change speed driving gearing interposed between the latter and the motor, said member and said entire reversing gearing being at the same end of said motor.

46. In a mining apparatus, a truck having running gear, a mining machine on said truck, said machine comprising cutting mechanism including a cutter bar, a motor, and feeding mechanism for moving said cutter bar in a direction at right angles to its major dimension, said motor having a power shaft provided with a driving element actuating said feeding mechanism, and means whereby said machine may propel said truck comprising a driving element movable with said machine into and out of truck driving relation and rotated by said power shaft independently of said first mentioned driving element.

47. In a mining apparatus, a truck adapted to support a mining machine and having running gear for use in running about a mine, a mining machine having projecting at one end thereof a cutter bar, at the other end thereof a motor, and, intermediate the projecting bar and said motor, feeding mechanism, and driving mechanism for said running gear actuated by said motor.

48. In a mining apparatus, a truck adapted to support a machine and having running gear for use in running about a mine, a mining machine having projecting at one end thereof a cutter bar, at the other end thereof a motor, and, intermediate the projecting bar and said motor, feeding mechanism, and driving mechanism for said running gear actuated by said motor and including a driving connection made and interrupted by movement of said machine upon said truck.

49. In a mining apparatus, a truck adapted to support a machine and having running gear for use in running about a mine, a mining machine having projecting at one end thereof a cutter bar, at the other end thereof a motor, and, intermediate the projecting bar and said motor, feeding mechanism including a transversely extending shaft, and driving mechanism for said running gear actuated by said motor.

50. In a mining apparatus, a truck adapted to support a machine and having running gear for use in running about a mine, a mining machine having projecting at one end thereof a cutter bar, at the other end thereof a motor, and, intermediate the projecting bar and said motor, feeding mechanism including a transversely extending shaft rotatable at a plurality of predetermined speeds, and driving mechanism for said running gear actuated by said motor.

51. In a mining apparatus, a truck adapted to support a machine and having running gear for use in running about a mine, a mining machine having projecting at one end thereof a cutter bar, at the other end thereof a motor, and, intermediate the projecting bar and said motor, feeding mechanism including a transversely extending shaft rotatable at a plurality of predetermined speeds in the same direction without reversing the motor, and driving mechanism for said running gear actuated by said motor.

52. In a mining apparatus, a mining machine having at one end thereof a projecting cutter chain carrying cutter bar and a cutter chain driving sprocket, at the other end thereof a motor having a power shaft rotatable on an axis extending longitudinally of the machine, feeding mechanism including a transversely extending shaft disposed between said motor and said cutter chain driving sprocket, and a truck driving element driven by said motor and rotatable on an axis parallel to a line parallel to the axis of said motor power shaft.

53. In a mining apparatus, a mining machine having at one end thereof a projecting cutter chain carrying cutter bar and a cutter chain driving sprocket, at the other end thereof a motor having a power shaft rotatable on an axis extending longitudinally of the machine, feeding mechanism including a transversely extending shaft disposed between said motor and said cutter chain driving sprocket, and a truck driving element driven by said motor and rotatable on an axis parallel to a line parallel to the axis of said motor power shaft and movable with said machine into and out of truck driving relation to a truck supported truck driving element.

54. In a mining apparatus, a mining machine having at one end thereof a pivoted cutter chain carrying cutter bar and a cutter chain driving sprocket, at the other end thereof a motor having a power shaft rotatable on an axis extending longitudinally of the machine, feeding mechanism including a transversely extending shaft disposed between said motor and said cutter chain driving sprocket, and a truck driving element driven by said motor and rotatable on an axis parallel to a line parallel to the axis of said motor power shaft.

55. Mining apparatus including a frame, cutting mechanism carried thereby including a cutter bar projecting from said frame, and means for effecting movement of said frame including a shaft on said frame, means for rotating said shaft at a plurality of speeds including gears coaxial therewith and selectively operatively connectible thereto, a member coaxial with said shaft and rotatable to effect feeding of said frame, and operative connections between said shaft and member including planetary gearing comprising an element moving in an orbit coaxial with said shaft and a stationary internal gear.

56. Mining apparatus including a frame, cutting mechanism carried thereby including a cutter bar projecting from said frame, and means for effecting movement of said frame including a shaft on said frame, means for rotating said shaft at a plurality of speeds including gears coaxial therewith and selectively operatively connectible thereto, a member coaxial with said shaft and rotatable to effect feeding of said frame, and operative connections between said shaft and member including planetary gearing comprising a stationary gear coaxial with said shaft, a driving pinion on said shaft, planetary gears between said pinion and stationary gear, and a supporting member for said planetary gears constituting a driving member for said first mentioned member.

57. Mining apparatus including a frame, cutting mechanism carried thereby including a cutter bar projecting from said frame, and means for effecting movement of said frame including a horizontal shaft on said frame, means for rotating said shaft at a plurality of speeds including gears coaxial therewith and selectively operatively connectible thereto, a member coaxial with said shaft and rotatable to effect feeding of said frame, and operative connections between said shaft and member including planetary gearing comprising an element moving in an orbit coaxial with said shaft and a stationary internal gear.

58. Mining apparatus including a frame, cutting mechanism carried thereby including a cutter bar projecting from said frame, and means for effecting movement of said frame including a horizontal shaft on said frame, means for rotating said shaft at a plurality of speeds including gears coaxial therewith and selectively operatively connectible thereto, a member coaxial with said shaft and rotatable to effect feeding of said frame, and operative connections between said shaft and member including planetary gearing comprising a stationary gear coaxial with said shaft, a driving pinion on said shaft, planetary gears between said pinion and stationary gear, and a supporting member for said planetary gears constituting a driving member for said first mentioned member.

59. Mining apparatus including a frame, cutting mechanism carried thereby including a cutter bar projecting from said frame, and means for effecting feeding movement of said frame including a motor on said frame having an armature shaft disposed longitudinally thereof, a horizontal shaft driven by said armature shaft, a driving element coaxial with said shaft and rotatable relative thereto, planetary gearing including a plurality of coaxial gears coaxial with said shaft and constituting actuating means for said element, and a member rotatable on a vertical axis and operative on rotation to effect propulsion of said machine frame and actuated by said element.

60. Mining apparatus including a frame, cutting mechanism carried thereby including a cutter bar projecting from said frame, and means for effecting feeding movement of said frame including a motor on said frame having an armature shaft disposed longitudinally thereof, a horizontal shaft driven by said armature shaft, a driving element coaxial with said shaft and rotatable relative thereto, planetary gearing including a plurality of coaxial gears coaxial with said shaft and constituting actuating means for said element, said planetary gearing being arranged at the other side of said element, with reference to the driving connection to said shaft of said motor, and a member rotatable on a vertical axis and operative on rotation to effect propulsion of said machine frame and actuated by said element.

61. Mining apparatus comprising, in combination, a frame, cutting mechanism carried thereby including a cutter bar pivotally supported thereon, and means for effecting movement of said bar during cutting including a motor on said frame, a shaft rotatable by said motor, a member coaxial with said shaft and rotatable to effect feeding of said frame, and planetary gearing including a planet carrier coaxial with and adapted to constitute a driving member for said first mentioned member and to rotate at equal angular rates therewith during slow speed drive thereof.

62. In a mining apparatus, cutting mechanism, feeding mechanism, and a motor for actuating both said cutting and feeding mechanisms, operative connections between said motor and said cutting mechanism, said feeding mechanism comprising a feed operating member rotatable on a vertical axis and cooperating with a stationary element one of whose extremities it approaches during feeding operation, and an operative connection between said motor and said feed operating member operative to effect rotation of the latter at a plurality of different predetermined speeds including planetary gearing.

63. In a mining apparatus, in combination, a machine frame having a cutter bar projecting therefrom, a motor on said frame, feed operating members supported on said frame respectively rotatable to effect sumping and lateral cutting, and means driven by said motor for controlling rotation of said members and adapted to cause rotation thereof at predetermined cutting and at predetermined higher speeds.

64. In a mining apparatus, in combination, a machine frame having a cutter bar projecting therefrom, a motor on said frame, feed operating members supported on said frame and rotatable on vertical axes respectively rotatable to effect sumping and lateral cutting, and means driven by said motor for controlling rotation of said members and adapted to cause rotation thereof at predetermined cutting and at predetermined higher speeds.

65. In a mining apparatus, in combination, a machine frame having a cutter bar projecting therefrom, a motor on said frame, feed operating members supported on said frame and rotatable on alined axes respectively rotatable to effect sumping and lateral cutting, and means driven by said motor for controlling rotation of said members and adapted to cause rotation thereof at predetermined cutting and at predetermined higher speeds.

66. In a mining apparatus, in combination, a machine frame having a cutter bar projecting therefrom, a motor on said frame, feed operating members supported on said frame and rotatable on alined vertical axes respectively rotatable to effect sumping and lateral cutting, and means driven by said motor for controlling rotation of said members and adapted to cause rotation thereof at predetermined cutting and at predetermined higher speeds.

67. In a mining apparatus, in combination, a machine frame having a pivotally mounted cutter bar projecting therefrom, a motor on said frame, feed operating members supported on said frame and each rotatable on a vertical axis and respectively rotatable to effect swinging of said bar into the coal and feeding of said frame longitudinally of a working face, and means driven by said motor for effecting rotation of each of said members and permitting rotation of one of said members independently of the other and adapted to cause rotation of said members at predetermined cutting and at predetermined higher speeds.

68. In a mining apparatus, in combination, a machine frame having a pivotally mounted cutter bar projecting therefrom, a motor on said frame, feed operating members supported on said frame and rotatable on alined vertical axes and respectively rotatable to effect swinging of said bar into the coal and feeding of said frame longitudinally of a working face, and means driven by said motor for effecting rotation of each of said members and permitting rotation of one of said members independently of the other and adapted to cause rotation of said members at predetermined cutting and at predetermined higher speeds.

69. In a mining apparatus, a motor having a horizontal power shaft, a shaft disposed perpendicular to said power shaft, a bevel gear on said shaft, a bevel pinion on said motor shaft driving said bevel gear, a worm rotating with said bevel gear, a worm wheel driven thereby, and a feed operating member rotatable on an axis parallel to a line parallel to the axis of rotation of said worm wheel and driven thereby, said feed operating member and worm wheel rotating on axes disposed in transversely extending vertical planes.

70. In a mining apparatus, a motor having a horizontal power shaft, a shaft disposed perpendicular to said power shaft, a bevel gear on said shaft, a bevel pinion on said motor shaft driving said bevel gear, a worm rotating with said bevel gear, a worm wheel driven thereby, and a feed operating member rotatable on an axis parallel to a line parallel to the axis of rotation of said worm wheel and driven thereby and clutch controlled driving connections between said worm and feed operating member, said feed operating member and worm wheel rotating on axes disposed in transversely extending vertical planes.

71. In a mining apparatus, a motor having a horizontal power shaft, cutting mechanism actuated thereby and including a circulating cutter chain, a cutter chain driving sprocket, actuating means therefor including a bevel gear coaxial with said sprocket and rotating on a vertical axis, and a bevel pinion meshing with and driving said gear and driven by said motor and rotating on an axis parallel to a line parallel to the axis of said motor, and feeding mechanism including a feed operating member and actuating means therefor including a worm driven by said motor and rotating on an axis different from said motor axis.

72. In a mining apparatus, a motor having a horizontal power shaft, cutting mechanism actuated thereby and including a circulating cutter chain, a cutter chain driving sprocket, actuating means therefor including a bevel gear coaxial with said sprocket and rotating on a vertical axis, and a bevel pinion meshing with and driving said gear and driven by said motor, said bevel pinion rotating on an axis parallel to a line parallel to the axis of rotation of said motor, and feeding mechanism including a feed operating member and actuating means therefor including a worm driven by said motor, said worm and pinion rotating on horizontal axes different from said motor axis.

73. In a mining apparatus, a motor having a horizontal power shaft, cutting mechanism actuated thereby and including a circulating cutter chain, a cutter chain driving sprocket, actuating means therefor including a bevel gear coaxial with said sprocket and rotating on a vertical axis, and a bevel pinion meshing with and driving said gear and driven by said motor, and feeding mechanism including a feed operating member and actuating means therefor including a worm driven by said motor and planetary gearing driven by said worm.

74. In a mining apparatus, a motor having a horizontal power shaft, cutting mechanism actuated thereby and including a circulating cutter chain, a cutter chain driving sprocket, actuating means therefor including a bevel gear coaxial with said sprocket and rotating on a vertical axis, and a bevel pinion meshing with and driving said gear and driven by said motor, and feeding mechanism including a feed operating member and actuating means therefor including a worm driven by said motor and planetary gearing driven by said worm, said worm and pinion rotating on horizontal axes.

75. Mining apparatus including a frame, cutting mechanism carried thereby including a cutter bar projecting from said frame, and means for effecting feeding movement of said frame including a motor on said frame having an armature shaft disposed longitudinally thereof, a horizontal shaft driven by said armature shaft, a worm coaxial with said shaft, a worm wheel driven by said worm, a member rotating with said worm wheel and on a vertical axis and operative on rotation to effect propulsion of said machine frame, and planetary driving gearing for said worm.

76. Mining apparatus including a frame, cutting mechanism carried thereby including a cutter bar projecting from said frame, and means for effecting feeding movement of said frame including a motor on said frame having an armature shaft disposed longitudinally thereof, a horizontal shaft driven by said armature shaft, a worm coaxial with said shaft, a worm wheel driven by said worm, a member rotating with said worm wheel and on a vertical axis and operative on rotation to effect propulsion of said machine frame, and planetary driving gearing for said worm comprising a sleeve constituting a driving element for said worm and operatively connectible to a planet carrier, a driving shaft extending through said sleeve and carrying a central driving gear and a coaxial stationary gear.

77. Mining apparatus including a frame, cutting mechanism carried thereby including a cutter bar projecting from said frame, and means for effecting feeding movement of said frame including a motor on said frame having an armature shaft disposed longitudinally thereof, a horizontal shaft driven by said armature shaft, a worm coaxial with said shaft, a worm wheel driven by said worm, a member rotating with said worm wheel and on a vertical axis and operative on rotation to effect propulsion of said machine frame, and plural speed driving gearing for said worm operative to effect rotation thereof at different speeds in the same direction including planetary driving gearing.

78. Mining apparatus including a frame, cutting mechanism carried thereby including a cutter bar projecting from said frame, and means for effecting feeding movement of said frame including a motor on said frame having an armature shaft disposed longitudinally thereof, a horizontal shaft driven by said armature shaft, a worm coaxial with said shaft, a worm wheel driven by said worm, a member rotating with said worm wheel and on a vertical axis and operative on rotation to effect propulsion of said machine frame, and plural speed driving gearing for said worm operative to effect rotation thereof at different speeds in the same direction all of whose elements rotate on horizontal axes including planetary driving gearing for said worm.

79. In a mining machine, cutting mechanism, a motor, and feeding mechanism for said machine driven by said motor including an element rotatable on a vertical axis to effect feeding and adapted to cooperate directly with and to move bodily longitudinally of a member extending in the direction of feeding movement, a worm wheel rotating on an axis parallel to a line parallel to the axis of said rotatable element and rotatable to effect rotation of the latter, a worm rotatable on a horizontal axis transverse to the direction of feed during cutting, a bevel gear coaxial with the worm and rotatable to effect rotation of said worm, and a driving connection between said motor and said bevel gear.

80. In a mining machine, cutting mechanism, a motor, and feeding mechanism for said machine driven by said motor including an element rotatable on a vertical axis to effect feeding and adapted to cooperate directly with a member extending in the direction of feeding movement, a worm wheel rotating on an axis parallel to a line parallel to the axis of said rotatable element and rotatable to effect rotation of the latter, a worm rotatable on a horizontal axis transverse to the direction of feed during cutting, a bevel gear coaxial with the worm and rotatable to effect rotation of said worm, and a driving connection between said motor and said bevel gear, said motor having a power shaft rotatable on an axis perpendicular to a vertical plane including said horizontal axis.

81. In a mining machine, cutting mechanism, a motor, and feeding mechanism for said machine driven by said motor including an element rotatable on a vertical axis to effect feeding and adapted to cooperate directly with a member extending in the direction of feeding movement, a worm wheel rotating on an axis parallel to a line parallel to the axis of said rotatable element and rotatable to effect rotation of the latter, a worm rotatable on a horizontal axis transverse to the direction of feed during cutting, a bevel gear coaxial with the worm and rotatable to effect rotation of said worm, and a driving connection between said motor and said bevel gear, said motor having a power shaft rotatable on an axis perpendicular to a vertical plane including said horizontal axis and at the opposite side of said plane from said worm wheel.

82. In a mining machine, cutting mechanism, a motor, and feeding mechanism for said machine driven by said motor including an element rotatable on a vertical axis to effect feeding and adapted to cooperate directly with a member extending in the direction of feeding movement, a worm wheel rotating on an axis parallel to a line parallel to the axis of said rotatable element and rotatable to effect rotation of the latter, a worm rotatable on a horizontal axis transverse to the direction of feed during cutting, a bevel gear coaxial with the worm and rotatable to effect rotation of said worm, and a driving connection between said motor and said bevel gear, said motor having a power shaft rotatable on an axis perpendicular to said horizontal axis, and said power shaft having a plurality of driving pinions one actuating said cutting mechanism and the other said feeding mechanism.

83. In a mining machine, cutting mechanism, a motor, and feeding mechanism for said machine driven by said motor including an element rotatable on a vertical axis to effect feeding and adapted to cooperate directly with a member extending in the direction of feeding movement, a worm wheel rotating on an axis parallel to a line parallel to the axis of said rotatable element and rotatable to effect rotation of the latter, a worm rotatable on a horizontal axis transverse to the direction of feed during cutting, a bevel gear coaxial with the worm and rotatable to effect rotation of said worm, and a driving connection between said motor and said bevel gear, said motor having a power shaft rotatable on an axis perpendicular to said horizontal axis and at the opposite side of said axis from said worm wheel, and said power shaft having a plurality of driving pinions one actuating said cutting mechanism and the other said feeding mechanism.

84. In a mining machine, a machine frame supporting a motor, cutting mechanism including a horizontally swingable cutter bar and mechanism for effecting feeding of said machine and swing of said bar actuated by said motor and including an element rotatable on a vertical axis to effect bar swing, a worm wheel rotating on a vertical axis and rotatable to effect rotation of said rotatable element, a worm rotatable on a horizontal axis, a bevel gear coaxial with said worm and rotatable to effect rotation of the latter, and a driving connection between said motor and said bevel gear, said motor having a power shaft extending longitudinally of said frame and said worm axis extending transversely of said frame.

85. In a mining machine, a machine frame supporting a motor, cutting mechanism including a horizontally swingable cutter bar and mechanism for effecting feeding of said machine and swing of said bar actuated by said motor and including an element rotatable on a vertical axis to effect bar swing, a worm wheel rotating on a vertical axis and rotatable to effect rotation of said rotatable element, a worm rotatable on a horizontal axis, a bevel gear coaxial with said worm and rotatable to effect rotation of the latter, and a driving connection between said motor and said bevel gear, said motor having a power shaft extending longitudinally of said frame and said worm axis extending transversely of said frame, and said motor shaft being at the opposite side of said transverse horizontal axis from said worm wheel.

86. In a mining machine, a machine frame supporting a motor, cutting mechanism including a horizontally swingable cutter bar and mechanism for effecting feeding of said machine and swing of said bar actuated by said motor and including an element rotatable on a vertical axis to effect bar swing, a worm wheel rotating on a vertical axis and rotatable to effect rotation of said rotatable element, a worm rotatable on a horizontal axis, a bevel gear coaxial with said worm and rotatable to effect rotation of the latter, and a driving connection between said motor and said bevel gear, said motor having a power shaft extending longitudinally of said frame and said worm axis extending transversely of said frame, the power shaft of said motor having a plurality of driving pinions respectively constituting actuating elements for the bar swinging mechanism and for the cutting mechanism.

87. In a mining machine, a machine frame supporting a motor, cutting mechanism including a horizontally swingable cutter bar and mechanism for effecting feeding of said machine and swing of said bar actuated by said motor and including an element rotatable on a vertical axis to effect bar swing, a worm wheel rotating on a vertical axis and rotatable to effect rotation of said rotatable element, a worm rotatable on a horizontal axis, a bevel gear coaxial with said worm and rotatable to effect rotation of the latter, and a driving connection between said motor and said bevel gear, said motor having a power shaft extending longitudinally of said frame and said worm axis extending transversely of said frame, and said motor shaft being at the opposite side of said transverse axis from said worm wheel, the power shaft of said motor having a plurality of driving pinions respectively constituting actuating elements for the bar swinging mechanism and for the cutting mechanism.

88. In a mining apparatus, cutter supporting and directing means parallel to and movable along a trackway, cutter mechanism movable bodily relative thereto comprising a pivotally mounted cutter bar having a cutter chain adapted to cut a kerf for said bar when the latter is presented edgewise to a face, and means for moving said bar relative to said directing means and across the end thereof to insert a kerf in the face.

89. In a mining apparatus, cutter supporting and directing means movable on a trackway, cutter mechanism movable bodily relative thereto comprising a pivotal support and a cutter bar thereon having a cutter chain adapted to cut a kerf for said bar when the latter is presented edgewise to a face, and means for moving said bar relative to said directing means and across the end thereof to insert a horizontal kerf in the face.

90. In a mining apparatus, cutter supporting and directing means parallel to and movable on a trackway, cutter mechanism movable therewith comprising a pivotally mounted cutter bar having a cutter chain adapted to cut a kerf for said bar when the latter is presented edgewise to a face, and means for moving said bar longitudinally and angularly relative to said directing means and across the end thereof to insert a kerf in the face.

91. In a mining apparatus, cutter supporting and directing means movable on a trackway into operative position at right angles to a face, cutter mechanism guided thereon comprising a pivotally mounted cutter chain-carrying cutter bar adapted to cut a path for itself when presented edgewise to the face, and power driven means for moving said bar longitudinally and angularly relative to said directing means to insert in the face a kerf of greater width than the length of said bar.

92. In an entry cutting apparatus, cutter supporting and guiding means movable over a trackway and disposable in fixed relation thereon at right angles to and substantially against an entry face, cutter mechanism movable therewith comprising a pivotally mounted cutter chain-carrying cutter bar adapted to cut a path for itself when presented edgewise to a face, and power driven means for moving said bar when angularly disposed successively longitudinally, angularly, and longitudinally in an opposite direction, all relative to said guiding means to insert a kerf forming a continuation of the entry.

93. In an entry cutting apparatus, a wheeled truck movable over a trackway and presenting cutter supporting and guiding devices disposable at right angles to and substantially against an entry face, cutter mechanism thereon comprising a motor and a pivotally mounted cutter chain-carrying bar, power driven means for moving said cutter mechanism longitudinally and angularly relative to said guiding devices to insert a kerf in the face, and truck wheel driving mechanism operatively connectible to and driven by said motor in a predetermined position of said cutter mechanism.

94. Mining apparatus comprising, in combination, a wheeled guiding means, cutting mechanism comprising a pivotally mounted cutter chain-carrying cutter bar movable lengthwise thereof, means for supporting said bar with its free end at an acute angle to said guiding means, and power driven means for moving said bar longitudinally of said guiding means and into the face when so disposed and thereafter successively swinging the same about its pivot in the same plane and withdrawing the same from the face by a reverse longitudinal movement.

95. In an entry driving mechanism, a wheeled guiding means, a mining machine comprising a cutter chain-carrying cutter bar movable substantially the length of said guiding means, a pivotal mounting for said cutter bar whereby the latter may be angularly disposed relative to said guiding means, and power driven actuating means and connections operative therewith for advancing and retracting said cutter bar on said guiding means while so disposed toward and from an entry face to make sumping and withdrawal cuts therein and swinging said cutter bar from one of said advanced cutting positions across the end of said guiding means to the other advanced cutting position to cut a kerf in the entry face.

96. In an entry driving mechanism, guiding means parallel to and movable on a trackway and disposed thereon at right angles to and substantially against a face, a mining machine movable longitudinally on said guiding means and comprising a pivotally mounted cutter bar having a cutter chain adapted to cut a path for said bar when the latter is presented edgewise to the face, and power driven means for inserting a kerf in the entry face having provision for moving said bar longitudinally of and angularly relative to said guiding means.

97. In an entry driving mechanism, a wheeled guiding means mounted on a trackway and adapted to be moved on said trackway at right angles to and substantially against an entry face, a mining machine comprising a cutter chain-carrying cutter bar adjustably mounted on said guiding means, a pivotal mounting for said cutter bar, and power driven actuating means and mechanism operative therewith for moving said cutter bar to either side of said guiding means and for advancing and retracting said cutter bar thereon and while so disposed toward and from an entry face to make sumping and withdrawal cuts therein.

98. A mining machine having a bed, a machine frame slidable upon the bed, a driving motor carried by the frame, motor-driven mechanism for feeding the frame longitudinally upon the bed in either direction without reversing said motor, a cutter bar, a turret in which said cutter bar is mounted, power-driven means to turn the turret in either direction without reversing said motor, a cutter chain, and power-driven means to drive the cutter chain in either direction by reversing said motor.

99. In a mining apparatus, a wheeled guiding means movable on a trackway, cutter mechanism thereon comprising a motor and a pivotally mounted horizontally disposed cutter bar, means for moving said cutter bar longitudinally or angularly relative to said guiding means to start a horizontal kerf in a face parallel to the trackway or to cut a horizontal kerf extending across the end of the truck in a face in front of the trackway, and means for varying the plane of operation of said bar.

100. In a mining apparatus, a truck having guiding means for a mining machine, a machine frame reciprocable along said guiding means and having thereon a cutter bar pivotable upon an axis parallel to a working face, means for swinging said bar upon said axis including a shaft having coaxial therewith reverse bevel gearing and friction clutch means for enabling either of said gears to operate as a shaft rotating element and means effective on rotation of said shaft to effect bar swing, and means for effecting reciprocation of said frame upon said guiding means to move said bar in its plane of swing towards and from the face to effect sumping and withdrawing cuts.

101. Mining apparatus including a guideway disposed perpendicularly to a face, mining mechanism thereon having an elongated cutter chain carrying cutter bar, supporting means for said bar permitting pivotal movement thereof across in front of the end of the guideway from positions with its cutting extremity at one side of said guideway to positions with its extremity at the opposite side of said guideway, bar controlling means operative to swing the same by power, to lock the same in different angular positions and to permit free swinging thereof, and means including a motor whose axis of rotation remains stationary during bar swing for effecting feeding of said mechanism along said guideway in opposite directions at a predetermined cutting speed or a predetermined higher speed.

102. Mining apparatus including a guideway disposed perpendicularly to a face, mining mechanism thereon having an elongated cutter chain carrying cutter bar, means whereby said bar is supported on said guideway with its cutting extremity free to swing across the front end of said guideway about a fixed axis located in rear of the front end of said guideway or held against swinging with said bar at acute angles to said guideway and at either side of the latter, variable speed transmission means included in said mechanism whereby said bar may be swung by power about said axis at different predetermined speeds, and power driven means wholly carried on said mining mechanism and automatically operative when once connected to feed at a constant predetermined speed in a given direction, including connections for feeding said bar translatively, when in opposite acute angled positions, at a predetermined rate of feed adapted to cutting, whereby said bar is moved bodily longitudinally of said guideway in opposite directions while said cutter chain rotates in one direction.

103. Mining apparatus including a guideway disposed perpendicularly to a face, mining mechanism thereon having an elongated cutter chain carrying cutter bar, means whereby said bar is supported on said guideway with its cutting extremity free to swing across the front end of said guideway about a fixed axis located in rear of the front end of said guideway or held against swinging with said bar at acute angles to said guideway and on either side of the latter, variable speed transmission means included in said mechanism whereby said bar may be swung by power about said axis at different predetermined speeds, and power driven means wholly carried on said mining mechanism and automatically operative when once connected to feed in a given direction, including connections for feeding said bar translatively when in opposite acute angled positions, at a predetermined rate of feed adapted to cutting, whereby said bar is moved bodily longitudinally of said guideway in opposite directions while said cutter chain rotates in one direction, and supplemental connections for moving said mechanism bodily longitudinally of said guideway at a substantially higher transport speed.

104. Mining apparatus including a guideway disposed perpendicularly to a face, mining mechanism thereon having an elongated, cutter carrying cutter bar, means for effecting orbital movement of said cutters, means whereby said bar is supported on said guideway with its cutting extremity free to swing across the front end of the guideway about a fixed axis located in rear of the front end of the guideway or held against swinging with the bar at acute angles to the guideway and projecting at an angle to the latter at either side thereof, and power driven variable speed transmission means wholly carried on the mining mechanism and including only gearing all of whose elements rotate on fixed axes and automatically operative when once connected to effect feed at the desired constant predetermined speed in a given direction including connections for feeding said bar translatively when in opposite acute angled positions in opposite directions longitudinally of said guideway at a predetermined rate of feed adapted to cutting and while said cutter chain rotates in one direction, and whereby said bar may be swung by power about said axis at different predetermined speeds.

105. In a mining apparatus, guiding means disposed perpendicular to a working face, and mechanism movable along said guiding means including cutting mechanism including a pivoted cutter bar swingable across the front end of said guiding means with its forward extremity in advance of the end of said guiding means, feeding mechanism, and a motor for actuating both said cutting and said feeding mechanisms, said motor having a longitudinally extending power shaft having fixed thereto spaced driving elements respectively constituting actuating elements for said cutting and feeding mechanisms and said feeding mechanism including a feed operating member and means for effecting rotation thereof at different predetermined speeds.

106. In a mining apparatus, guiding means disposed perpendicular to a working face, and mechanism movable along said guiding means including cutting mechanism including a pivoted cutter bar swingable across the front end of said guiding means with its forward extremity in advance of the end of said guiding means, feeding mechanism and a motor for actuating both said cutting and said feeding mechanisms, said motor having a longitudinally extending power shaft having fixed thereto spaced driving elements respectively constituting actuating elements for said cutting and feeding mechanisms and said feeding mechanism including a feed operating member and means for effecting rotation thereof in opposite directions at different predetermined speeds.

107. In a mining mechanism, in combination, guiding means, a support movable thereon, a second support swiveled on said support, power operated means for rotating said second support, motor driven cutting mechanism including an independently swinging cutter bar adjustable rectilinearly on said second support in a direction parallel to the axis of said swivel, and self-contained power operated means for feeding said bar longitudinally or angularly during cutting.

108. In a mining mechanism, in combination, guiding means, a support movable longitudinally thereof, a second support swiveled on a fixed vertical axis on said support, power means for rotating said second support on said axis, power driven cutting mechanism, and means for vertically rectilinearly adjusting said cutting mechanism on said second support including power means carried by said latter support.

109. In a mining mechanism, in combination, guiding means, a support movable longitudinally thereof, a second support swiveled on a vertical axis on said support, power driven cutting mechanism vertically rectilinearly adjustable on said second support, and self-contained power operated means for feeding said cutting mechanism longitudinally or angularly during cutting.

110. In a mining machine, a horizontally extending motor having a power shaft, self-contained means operated by said motor for feeding said motor forwardly and rearwardly in the direction in which said power shaft extends at a cutting speed, and cutting mechanism actuated by said motor including an adjustably mounted cutter bar disposable in horizontal positions to cut kerfs whose respective lower bounding planes are respectively above and below the axis of said power shaft, and means for moving said cutter bar between said positions while maintaining the same at all times parallel to a horizontal plane.

111. In a mining machine, a horizontally extending motor having a power shaft, self-contained means operated by said motor for feeding said motor forwardly towards a working face and away therefrom at a cutting speed, pivoted cutting mechanism actuated by said motor including a cutter bar and means for swinging the same by power from said motor, and adjustable supporting means therefor including means for positioning said bar in different planes parallel to the motor axis and respectively substantially spaced therefrom or proximate thereto, and means operable to effect movement of said cutter bar into different ones of said positions while it remains parallel to a single plane.

112. In a mining apparatus, in combination, a machine frame having a cutter bar projecting therefrom, a motor on said frame, feed operating members supported on said frame and respectively rotatable to effect sumping and lateral cutting, and means driven by said motor for selectively effecting rotation of said members and adapted to cause rotation thereof at predetermined cutting and at predetermined higher speeds.

113. In a mining apparatus, in combination, a machine frame having a cutter bar projecting therefrom, a motor on said frame, feed operating members supported on said frame and rotatable on vertical axes and respectively rotatable to effect sumping and lateral cutting, and means driven by said motor for selectively effecting rotation of said members and adapted to cause rotation thereof at predetermined cutting and at predetermined higher speeds.

114. In a mining apparatus, in combination, a machine frame having a cutter bar projecting therefrom, a motor on said frame, feed operating members supported on said frame and rotatable on alined axes and respectively rotatable to effect sumping and lateral cutting, and means driven by said motor for selectively effecting rotation of said members and adapted to cause rotation thereof at predetermined cutting and at predetermined higher speeds.

115. In a mining apparatus, in combination, a machine frame having a cutter bar projecting therefrom, a motor on said frame, feed operating members supported on said frame and rotatable on alined vertical axes and respectively rotatable to effect sumping and lateral cutting, and means driven by said motor for selectively effecting rotation of said members and adapted to cause rotation thereof at predetermined cutting and at predetermined higher speeds.

116. In a mining apparatus, in combination, a machine frame having a cutter bar projecting therefrom, a motor on said frame, feed operating members supported on said frame and respectively rotatable to effect sumping and lateral cutting, and means including epicyclic reduction gearing driven by said motor for selectively effecting rotation of said members and adapted to cause rotation thereof at predetermined cutting and at predetermined higher speeds.

117. In a mining apparatus, in combination, a machine frame having a cutter bar projecting therefrom, a motor on said frame, feed operating members supported on said frame and rotatable on vertical axes and respectively rotatable to effect sumping and lateral cutting, and means including epicyclic reduction gearing driven by said motor for selectively effecting rotation of said members and adapted to cause rotation thereof at predetermined cutting and at predetermined higher speeds.

118. In a mining apparatus, in combination, a machine frame having a cutter bar projecting therefrom, a motor on said frame, feed operating members supported on said frame and rotatable on alined axes and respectively rotatable to effect sumping and lateral cutting, and means including epicyclic reduction gearing driven by said motor for selectively effecting rotation of said members and adapted to cause rotation thereof at predetermined cutting and at predetermined higher speeds.

119. In a mining apparatus, in combination, a machine frame having a cutter bar projecting therefrom, a motor on said frame, feed operating members supported on said frame and rotatable on alined vertical axes and respectively rotatable to effect sumping and lateral cutting, and means including epicyclic reduction gearing driven by said motor for selectively effecting rotation of said members and adapted to cause rotation thereof at predetermined cutting and at predetermined higher speeds.

120. In a mining apparatus, in combination, a machine frame having a chain carrying cutter bar projecting therefrom, a motor on said frame, feed operating members rotatably supported on said frame with their axes parallel to a single straight line, and means for effecting rotation of one of said members to effect sumping and the other to effect cutting feed of said apparatus as a whole including means driven by said motor to effect rotation of said members selectively and adapted to cause rotation of each of the same at predetermined cutting and higher speeds while said cutter chain moves in the same manner.

121. In a mining apparatus, in combination, a machine frame having a chain carrying cutter bar projecting therefrom, a motor on said frame, feed operating members rotatably supported on said frame with their axes parallel to a single straight line, and means for effecting rotation of one of said members to effect sumping and the other to effect cutting feed of said apparatus as a whole including means driven by said motor to effect rotation of said members selectively and adapted to cause rotation of each of the same at predetermined cutting and higher speeds while said cutter chain moves in the same manner including a common plural predetermined speed transmission device through which each may be driven.

122. In a mining apparatus, in combination, a machine frame having a chain carrying cutter bar projecting therefrom, a motor on said frame, feed operating members rotatably supported on said frame with their axes parallel to a single straight line, and means for effecting rotation of one of said members to effect sumping and the other to effect cutting feed of said apparatus as a whole including means driven by said motor to effect rotation of said members selectively and adapted to cause rotation of each of the same at predetermined cutting and higher speeds while said cutter chain moves in the same manner including a common friction controlled plural predetermined speed transmission mechanism through which each may be driven.

123. In a mining apparatus, in combination, a machine frame having a chain carrying cutter bar projecting therefrom, a motor on said frame, feed operating members rotatably supported on said frame with their axes parallel to a single straight line, and means for effecting rotation of one of said members to effect sumping and the other to effect cutting feed of said apparatus as a whole including means driven by said motor to effect rotation of said members selectively and adapted to cause rotation of each of the same at predetermined cutting and higher speeds while said cutter chain moves in the same manner including common gearing providing drives at different predetermined speeds in the same direction, through which gearing each of said members may be driven.

124. In a mining apparatus, in combination, a machine frame having a chain carrying cutter bar projecting therefrom, a motor on said frame, feed operating members rotatably supported on said frame on axes in the same straight line, and means for effecting rotation of one of said members to effect sumping and the other to effect cutting feed of said apparatus as a whole, said last mentioned member adapted to cooperate directly with an element extending in the direction of feeding movement of said frame during cutting to effect cutting, and said means for effecting rotation including means driven by said motor to effect rotation of said members selectively and adapted to cause rotation of each of the same at predetermined cutting and higher speeds while said cutter chain moves in the same manner.

125. In a mining apparatus, in combination, a machine frame having a chain carrying cutter bar projecting therefrom, a motor on said frame, feed operating members rotatably supported on said frame on axes in the same straight line, and means for effecting rotation of one of said members to effect sumping and the other to effect cutting feed of said apparatus as a whole, said last mentioned member adapted to cooperate directly with an element extending in the direction of feeding movement of said frame during cutting to effect cutting, and said means for effecting rotation including means driven by said motor to effect rotation of said members selectively and adapted to cause rotation of each of the same at predetermined cutting and higher speeds while said cutter chain moves in the same manner including a common plural predetermined speed transmission device through which each may be driven.

126. In a mining apparatus, in combination, a machine frame having a chain carrying cutter bar projecting therefrom, a motor on said frame, feed operating members rotatably supported on said frame on axes in the same straight line, and means for effecting rotation of one of said members to effect sumping and the other to effect cutting feed of said apparatus as a whole, said last mentioned member adapted to cooperate directly with an element extending in the direction of feeding movement of said frame during cutting to effect cutting, and said means for effecting rotation including means driven by said motor to effect rotation of said members selectively and adapted to cause rotation of each of the same at predetermined cutting and higher speeds while said cutter chain moves in the same manner including a common friction controlled plural predetermined speed transmission mechanism through which each may be driven.

127. In a mining apparatus, in combination, a machine frame having a chain carrying cutter bar projecting therefrom, a motor on said frame, feed operating members rotatably supported on said frame on axes in the same straight line, and means for effecting rotation of one of said members to effect sumping and the other to effect cutting feed of said apparatus as a whole, said last mentioned member adapted to cooperate directly with an element extending in the direction of feeding movement of said frame during cutting to effect cutting, and said means for effecting rotation including means driven by said motor to effect rotation of said members selectively and adapted to cause rotation of each of the same at predetermined cutting and higher speeds while said cutter chain moves in the same manner including common gearing providing drives at different predetermined speeds in the same direction, through which gearing each of said members may be driven.

128. In a mining apparatus, in combination, a machine frame having a chain carrying cutter bar projecting therefrom, a motor on said frame, feed operating members rotatably supported on said frame on vertical axes, and means for effecting rotation of one of said members to effect sumping and the other to effect cutting feed of said apparatus as a whole including means driven by said motor to effect rotation of said members selectively and adapted to cause rotation of each of the same at predetermined cutting and higher speeds while said cutter chain moves in the same manner including a common plural predetermined speed transmission device through which each may be driven.

129. In a mining apparatus, a machine frame having thereon a cutter bar pivotable upon an axis substantially parallel to a working face, motor driven means for swinging said bar upon said axis including a shaft extending in a direction transverse to the direction of said axis and having coaxial therewith reverse gearing and clutch means for selectively connecting different elements of said reverse gearing to effect bar swing, and means for effecting reciprocation of said frame at a cutting speed, prior to and following a swinging cut, to make sumping and withdrawing cuts and complete a kerf with substantially parallel ribs.

130. In a mining apparatus, a machine frame having thereon a cutter bar pivotable upon an axis parallel to a working face, motor driven means for swinging said bar upon said axis including a shaft having coaxial therewith reverse gearing and clutch means for selectively connecting different elements of said reverse gearing to effect bar swing, and motor operated means for effecting reciprocation of said frame at a cutting speed, prior to and following a swinging cut, to make sumping and withdrawing cuts and complete a kerf with substantially parallel ribs.

131. In a mining apparatus, a machine frame having thereon a cutter bar pivotable upon an axis parallel to a working face, motor driven means for swinging said bar upon said axis including a shaft having coaxial therewith reverse gearing and clutch means for selectively connecting different elements of said reverse gearing to effect bar swing, and means operable from the same source of power as said reverse gearing for effecting reciprocation of said frame at a cutting speed, prior to and following a swinging cut, to make sumping and withdrawing cuts and complete a kerf with substantially parallel ribs.

132. Mining apparatus including a frame movable relative to a working face during cutting, a motor having a power shaft disposed longitudinally of said frame and stationary save for rotation on its own axis with respect thereto, a pivoted cutter bar supported by said frame for swinging movement in a plurality of parallel planes, means for supporting said bar on said frame permitting adjustment thereof bodily into a plurality of parallel positions differently spaced from the axis of said shaft during transition through all of which positions the axis of the bar remains in a single plane parallel to a line parallel to the axis of said power shaft, driving connections between said motor and said cutter bar operative to transmit power to the latter in all positions thereof, and propulsion means for said frame adapted to effect feeding thereof during cutting and driven by said motor.

133. Mining apparatus including a frame movable relative to a working face during cutting, a motor having a power shaft disposed longitudinally of said frame and stationary save for rotation on its own axis with respect thereto, a pivoted cutter bar supported by said frame for swinging movement in a plurality of horizontal planes, means for supporting said bar on said frame permitting adjustment thereof bodily from certain of said horizontal planes into other horizontal planes and maintaining the axis of the bar in a single plane parallel to a line parallel to the axis of said power shaft during the movement of said bar, driving connections between said motor and said cutter bar operative to transmit power to the latter in all positions thereof, and propulsion means for said frame driven by said motor and operative to effect feeding thereof rectilinearly during cutting.

134. Mining apparatus including a frame movable relative to a working face during cutting, a motor having a power shaft disposed longitudinally of said frame and stationary save for rotation on its own axis with respect thereto, a pivoted cutter bar, supporting means for said bar on said frame permitting bodily adjustment thereof to positions in which said bar may swing in different parallel planes while the pivot of said bar remains in a single plane parallel to a line parallel to the axis of rotation of said power shaft, and means driven from said shaft for actuating said bar and swinging the latter and for propelling said frame relative to the face in opposite directions during cutting.

135. Mining apparatus including a frame movable relative to a working face during cutting, a motor having a power shaft disposed longitudinally of said frame and stationary save for rotation on its own axis with respect thereto, a pivoted cutter chain carrying cutter bar, supporting means for said bar on said frame permitting bodily adjustment thereof to positions in which said bar may swing in different parallel planes while the pivot of said bar remains in a single plane parallel to a line parallel to the axis of rotation of said power shaft, and operative to effect such adjustment when said cutter chain is idle, and means driven from said shaft for actuating the cutter chain on said bar and swinging the latter and for propelling said frame relative to the face in opposite directions during cutting.

136. Mining apparatus including a frame movable relative to a working face during cutting, a motor having a power shaft disposed horizontally on said frame and stationary save for rotation on its own axis with respect thereto, a pivoted cutter chain carrying bar, supporting means for said bar on said frame permitting bodily adjustment thereof to positions in which said bar may swing in different parallel planes while the pivot of said bar remains in a single plane parallel to a line parallel to the axis of rotation of said power shaft, and means driven from said shaft for actuating said cutter chain and swinging the bar and for propelling said frame relative to the face in opposite directions during cutting.

137. Mining apparatus including a frame movable relative to a working face during cutting, a motor having a power shaft disposed on said frame and stationary save for rotation on its own axis with respect thereto, a pivoted cutter chain carrying cutter bar, supporting means for said bar on said frame permitting bodily adjustment thereof to positions in which said bar may swing in different parallel planes while the pivot of said bar remains in a single plane parallel to a line parallel to the axis of rotation of said power shaft and operative to effect such adjustment when said cutter chain is idle, and means driven from said shaft for actuating said cutter chain and swinging the bar and for propelling said frame relative to the face in opposite directions during cutting.

138. Mining apparatus including a frame movable relative to a working face during cutting, a motor having a power shaft disposed longitudinally of said frame and stationary save for rotation on its own axis with respect thereto, a pivoted cutter bar having orbitally movable cutter bits, means for supporting said bar on said frame for adjustment, while the axis of pivotal movement of said bar remains at all times in a single plane parallel to a line parallel to the axis of the motor shaft, bodily toward and from and into a plane perpendicular to said first mentioned plane and including the axis of said shaft, and means driven from said shaft for actuating said cutter bits and swinging the bar and for propelling said frame relative to the face in opposite directions during cutting.

139. Mining apparatus including a frame movable longitudinally along guideways arranged perpendicularly to a working face during cutting, a motor on said frame having a power shaft parallel to the direction of movement of said frame along such guideways, a plane pivoted cutter chain carrying cutter bar supported on said frame, means between said bar and frame permitting translatory adjustment of said bar relative to said frame and motor towards and from the axis of the latter consecutively through a series of positions in each of which it remains parallel to its original plane, driving connections between said motor and bar for actuating the chain on said bar and operative in each position of the latter, and means driven by said motor for propelling said frame rectilinearly in opposite directions during cutting.

140. Apparatus for entry cutting by the successive insertion of rectilinear sumping, swinging transverse, and reversely rectilinear withdrawal cuts, including an organization of parts having adjacent the end thereof remote from the face to be cut motor devices, adjacent the opposite end thereof, namely adjacent the end nearest the face during cutting, a cutter chain carrying cutter bar mounted for pivotal movement, and, between said cutter bar and said motor devices, devices for effecting opposite rectilinear cutting movements at a cutting speed.

141. Apparatus for entry cutting by successive insertion of rectilinear sumping, swinging transverse, and reversely rectilinear withdrawal cuts, including an organization of parts having adjacent the end thereof remote from the face to be cut motor devices, adjacent the opposite end thereof, namely adjacent the end nearest the face during cutting, a cutter chain carrying cutter bar mounted for pivotal movement, and for movement into different planes in which kerfs are to be formed, and, between said cutter bar and said motor devices, devices for effecting opposite rectilinear cutting movements at a cutting speed.

142. Apparatus for entry cutting by successive insertion of rectilinear sumping, swinging transverse, and reversely rectilinear withdrawal cuts, including an organization of parts having adjacent the end thereof remote from the face to be cut motor devices, adjacent the opposite end thereof, namely, adjacent the end nearest the face during cutting, a cutter chain carrying cutter bar mounted for pivotal movement, and for movement into any one of a series of parallel planes, and, between said cutter bar and said motor devices, devices for effecting opposite rectilinear cutting movements at a cutting speed.

143. Apparatus for entry cutting by successive insertion of rectilinear sumping, swinging transverse, and reversely rectilinear withdrawing cuts, including an organization of parts having adjacent the end thereof remote from the face to be cut motor devices, adjacent the opposite end thereof, namely adjacent the end nearest the face during cutting, a cutter chain carrying cutter bar mounted for pivotal movement, and between the bar pivot and the motor devices, power operated bar swinging devices and self-contained power operated means for effecting opposite rectilinear cutting movements of the machine at a cutting speed, both actuated by power from said motor devices.

144. Apparatus for entry cutting by successive insertion of rectilinear sumping, swinging transverse, and reversely rectilinear withdrawing cuts, including an assemblage of mechanisms having adjacent the end thereof remote from the face to be cut motor devices, adjacent the opposite end thereof, namely adjacent the end nearest the face during cutting, a cutter chain carrying cutter bar mounted for pivotal movement, and having coaxial with the pivot thereof a gear element for transmitting swinging movement to the cutter bar, and between the bar pivot and said motor devices, and actuated by the latter, means for effecting sumping and withdrawal movements at a cutting speed and rotation of said gear at a cutting speed.

145. Apparatus for entry cutting by successive insertion of rectilinear sumping, swinging transverse, and reversely rectilinear withdrawing cuts, including a supporting frame having adjacent the end thereof remote from the face to be cut motor devices, adjacent the opposite end thereof, namely adjacent the end nearest the face during cutting, a cutter chain carrying cutter bar mounted for pivotal movement and having a gear rotatable to swing the bar coaxial with the bar pivot, and, intermediate said motor devices and said bar pivot, mechanism operated by said motor for effecting opposite rectilinear cutting movements of the cutter bar and the transmission of rotative movement to said gear, and a train of mechanism for actuating the cutting chain extending thereto, said bar swinging mechanism including devices for rotating said bar swinging gear while the cutter chain is idle.

146. Apparatus for entry cutting by successive insertion of rectilinear sumping, swinging transverse, and reversely rectilinear withdrawing cuts, including a frame having adjacent the end thereof remote from the face to be cut motor devices, adjacent the opposite end thereof, namely adjacent the end nearest the face during cutting, a cutter chain carrying cutter bar mounted for pivotal movement, and between said cutting mechanism and said motor devices, mechanism for effecting opposite rectilinear cutting feed of the cutter bar including reverse gearing arranged on a transversely extending horizontal axis.

147. Apparatus for entry cutting by successive insertion of rectilinear sumping, swinging transverse, and reversely rectilinear withdrawing cuts, including a frame having adjacent the end thereof remote from the face to be cut motor devices, adjacent the opposite end thereof, namely adjacent the end nearest the face during cutting, a cutter chain carrying cutter bar mounted for pivotal movement, and between said cutting mechanism and said motor devices, mechanism for effecting opposite rectilinear cutting feed of the cutter bar including reverse gearing including oppositely rotating gears selectively active as transmission elements and rotatable on axes disposed in a plane extending transversely of the major dimension of said frame.

148. Apparatus for entry cutting by successive insertion of rectilinear sumping, swinging transverse, and reversely rectilinear withdrawal cuts, including a transportable support, kerf cutting mechanism on said support including a pivoted cutter bar swingable horizontally relative to said support to effect a transverse cutting operation, motor devices on said support, and mechanism driven by said motor devices for swinging said cutter bar about its pivot in either of opposite directions including a power shaft extending longitudinally of the machine, a bevel pinion fixed to said power shaft at its forward end, reverse bevels meshing with said bevel pinion, a shaft coaxial with said reverse bevels, clutch devices for selectively connecting said reverse bevels in driving relation with said shaft, and connections between said coaxial shaft and said cutter bar.

149. Apparatus for entry cutting by successive insertion of rectilinear sumping, swinging transverse, and reversely rectilinear withdrawal cuts, including a transportable support, kerf cutting mechanism on said support including a pivoted cutter bar swingable horizontally relative to said support to effect a transverse cutting operation, motor devices on said support, and mechanism driven by said motor devices for swinging said cutter bar about its pivot in either of opposite directions including a power shaft whose axis is in a plane extending longitudinally of the machine, a bevel pinion fixed to said power shaft at its forward end, reverse bevels meshing with said bevel pinion, a shaft coaxial with said reverse bevels, clutch devices for selectively connecting said reverse bevels in driving relation with said shaft, and connections between said coaxial shaft and said cutter bar including self-locking worm gearing.

150. Apparatus for entry cutting by successive insertion of rectilinear sumping, swinging transverse, and reversely rectilinear withdrawal cuts, including a transportable support, kerf cutting mechanism on said support including a pivoted cutter bar swingable horizontally relative to said support to effect a transverse cutting operation, motor devices on said support, and mechanism driven by said motor devices for swinging said cutter bar about its pivot in either of opposite directions including a power shaft with its axis in a vertical plane extending longitudinally of the machine, a bevel pinion fixed to said power shaft at its forward end, reverse bevels meshing with said bevel pinion, a shaft coaxial with said reverse bevels, clutch devices for selectively connecting said reverse bevels in driving relation with said shaft, and connections between said coaxial shaft and said cutter bar including a transverse shaft, a worm secured to said transverse shaft and a worm wheel rotating about a vertical axis and meshing with said worm.

151. In a mining apparatus, supporting means movable on a trackway, cutter mechanism thereon comprising a pivotally mounted cutter bar having a chain adapted to cut a kerf for said bar in a face when said bar is presented edgewise thereto, and self-contained power operated means for moving said bar bodily rectilinearly of the trackway, about its pivot in the same plane, and reversely rectilinearly of the trackway to insert a parallel ribbed kerf in a face in front of the end of the trackway.

152. In a mining apparatus, supporting means movable on a trackway, cutter mechanism thereon comprising a pivotally mounted cutter bar having a chain adapted to cut a kerf for said bar in a face when said bar is presented edgewise thereto, and self-contained power operated means for moving said bar bodily rectilinearly relative to the trackway, about its pivot in the same plane, and reversely rectilinearly to insert a horizontal parallel ribbed kerf in a face in front of the end of the trackway.

153. In a mining apparatus, a wheeled truck movable on a trackway, cutter mechanism thereon comprising a motor and a pivotally mounted cutter chain-carrying cutter bar, and self-contained power operated mechanism supported by said truck for moving said bar angularly in front of and across the end of said truck and relative to said trackway at one speed and longitudinally of said trackway at a plurality of speeds.

154. In a mining apparatus, a wheeled truck movable on a trackway, cutter mechanism thereon comprising a motor and a pivotally mounted cutter chain-carrying cutter bar, and self-contained power operated mechanism supported by said truck for moving said bar angularly in front of and across the end of said truck and relative to said trackway at a cutting speed and longitudinally of said trackway at either a cutting or a higher speed.

155. In a mining apparatus, a wheeled truck movable on a trackway, cutter mechanism thereon comprising a motor and a pivotally mounted cutter chain-carrying cutter bar, and self-contained power operated mechanism supported by said truck for moving said bar angularly in front of and across the end of said truck and relative to said trackway at a cutting speed and longitudinally of said trackway at either a cutting or a transport speed.

156. In a mining apparatus, a wheeled truck movable on a trackway, cutter mechanism thereon comprising a motor and a pivotally mounted cutter chain-carrying cutter bar, self-contained power operated mechanism supported by said truck for moving said bar either longitudinally of said trackway or angularly relative thereto in front of and across the end of the truck at a cutting speed, and wheel driving mechanism adapted to propel said truck from place to place at a higher transport speed.

157. In a mining apparatus, a wheeled truck movable on a trackway, cutter mechanism thereon comprising a motor and a pivotally mounted cutter chain-carrying cutter bar, and self-contained power operated mechanism supported by said truck for moving said bar either angularly in front of and across the end of said truck or longitudinally relative to said trackway at a feeding speed to cut either a right angle or a parallel face.

158. In a mining apparatus, a wheeled truck movable on a trackway, cutter mechanism thereon comprising a motor and a pivotally mounted cutter chain-carrying cutter bar, self-contained power operated mechanism supported by said truck for moving said bar either longitudinally of said trackway or in front of and across the end of said truck to cut either a parallel or a right angle face at a cutting speed, and wheel driving means for transporting said mechanism from place to place at a different speed.

159. In a mining apparatus, a wheeled truck movable on a trackway, cutter mechanism thereon comprising a motor and a pivotally mounted cutter chain-carrying cutter bar, and self-contained power operated mechanism supported by said truck for feeding said bar longitudinally of the trackway in either direction and swinging the same in front of and across the end of the truck at one speed and transporting the same along the trackway at a different speed.

160. In a mining apparatus, a wheeled truck movable on a trackway, cutter mechanism thereon comprising a motor and a pivotally mounted cutter chain-carrying cutter bar, and self-contained power operated mechanism supported by said truck for feeding said bar longitudinally of the trackway in either direction or swinging the same in front of and across the end of the truck at a cutting speed and transporting the same along the trackway at a different speed and in either direction.

161. In a mining apparatus, a wheeled truck movable on a trackway, cutter mechanism including a cutter chain-carrying cutter bar disposable in fixed relation at acute angles to the trackway and pivotally mounted on said truck, and self-contained power operated means supported on said truck for moving said bar when so disposed rectilinearly relative to the trackway, relatively transversely in the same plane, and reversely rectilinearly to form a parallel ribbed kerf of a depth substantially equal to the length of the bar and in a face in front of the end of the trackway.

162. In a mining apparatus, a wheeled truck movable on a trackway, cutter mechanism including a cutter chain-carrying cutter bar disposable in fixed relation at acute angles to the trackway and pivotally mounted on said truck, and self-contained power operated means supported on said truck for moving the bar when so disposed rectilinearly relative to the trackway, relatively transversely in the same plane, and reversely rectilinearly to form a parallel ribbed horizontal kerf of a depth substantially equal to the length of the bar and in a face in front of the end of the trackway.

163. In a mining apparatus, a wheeled truck movable on a trackway, cutter mechanism including a cutter chain carrying cutter bar disposable in fixed relation at acute angles to the trackway, and pivotally mounted on said truck, self-contained power operated means supported on said truck for moving the bar when so disposed rectilinearly relative to the trackway, relatively transversely in the same plane, and reversely rectilinearly to form a parallel ribbed horizontal kerf of a depth substantially equal to the length of the bar and in a face in front of the trackway, and power operated means for varying the plane of operation of said bar.

164. In a mining apparatus, a wheeled truck movable on a trackway, cutter mechanism including a motor and a cutter bar disposable in fixed relation at acute angles to the trackway and pivotally mounted on said truck, and self-contained power operated means supported on said truck and driven by said motor for moving said bar when so disposed rectilinearly relative to the trackway, relatively transversely in the same plane, and reversely rectilinearly to form a parallel ribbed kerf of a depth substantially equal to the length of the bar and in a face in front of the end of the trackway.

165. In a mining apparatus, a wheeled truck movable on a trackway, cutter mechaanism including a motor and a cutter bar disposable in fixed relation at acute angles to the trackway and pivotally mounted on said truck, self-contained power operated means supported on said truck and driven by said motor for moving said bar when so disposed rectilinearly relative to the trackway, relatively transversely in the same plane, and reversely rectilinearly to form a parallel ribbed kerf of a depth substantially equal to the length of the bar and in a face in front of the end of the trackway, and truck wheel driving mechanism connectible with said motor and operative to propel the truck at a speed greater than the speed of movement of said bar during cutting.

166. In a mining apparatus, a wheeled truck movable on a trackway, cutter mechanism thereon comprising a motor and a pivotally mounted cutter chain-carrying cutter bar adapted to swing in front of and across the end of the truck, mechanism solely supported by said truck for moving said bar angularly relative to said trackway, and power operated means solely supported by said truck for feeding said bar longitudinally of the trackway and transporting the same thereover at different speeds.

167. In a mining apparatus, a wheeled truck movable on a trackway, cutter mechanism thereon comprising a motor and a pivotally mounted cutter chain-carrying cutter bar adapted to swing across the end of the truck, and self-contained power operated mechanism supported solely by said truck for moving said bar angularly relative to said trackway and reversely longitudinally relative thereto during cutting.

168. Mining apparatus including a wheeled truck movable over a trackway, mining mechanism thereon having an elongated cutter chain carrying cutter bar, means whereby said bar is supportable on said truck with its cutting extremity free to swing across the front end of said truck about a fixed axis in rear of the front end of the truck or held against swinging with said bar at acute angles to a trackway and on either side of the latter, change speed gearing whereby said bar may be swung by power about said axis in opposite directions at different predetermined speeds, and power driven means wholly carried on said truck and comprising only gearing all of whose elements rotate on fixed axes and automatically operative when once connected to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction.

169. Mining apparatus including a wheeled truck movable over a trackway, mining mechanism thereon having an elongated cutter chain carrying cutter bar, means whereby said bar is supportable on said truck with its cutting extremity free to swing across the front end of said truck about a fixed axis in rear of the front end of the truck or held against swinging with said bar at acute angles to a trackway and on either side of the latter, change speed gearing whereby during cutting said bar may be swung by power about said pivot at different predetermined speeds, and power driven means wholly carried on said truck and comprising only gearing all of whose elements rotate on fixed axes and automatically operative, when once connected, to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction, and supplemental connections for moving said truck bodily longitudinally of a trackway at a substantially higher transport speed.

170. Mining apparatus including a wheeled truck movable over a trackway, mining mechanism thereon having a motor and an elongated cutter chain carrying cutter bar driven thereby, means whereby said bar is supportable on said truck with its cutting extremity free to swing across the front end of said truck about a fixed axis or held against swinging with said bar at acute angles to a trackway and on either side of the latter, variable speed transmission means driven by the same motor whereby during cutting said bar may be swung by power about said axis at different predetermined speeds, and power driven means driven by the same motor and wholly carried on said truck and automatically operative when once connected to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction.

171. Mining apparatus including a wheeled truck movable over a trackway, mining mechanism thereon having a motor and an elongated cutter chain carrying cutter bar driven thereby, means whereby said bar is supportable on said truck with its cutting extremity free to swing across the front end of said truck about a fixed axis or held against swinging with said bar at acute angles to a trackway and on either side of the latter, variable speed transmission means driven by the same motor whereby during cutting said bar may be swung by power about said axis at different predetermined speeds, and power driven means driven by the same motor and wholly carried on said truck and automatically operative when once connected to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction, and supplemental connections for moving said truck bodily longitudinally of a trackway at a substantially higher transport speed.

172. Mining apparatus including a wheeled truck movable over a trackway, mining mechanism thereon having an elongated cutter chain carrying cutter bar, means whereby said bar is supportable on said truck with its cutting extremity free to swing across the front end of said truck about a fixed axis or held against swinging with said bar at acute angles to a trackway and on either side of the latter, change speed gearing whereby during cutting said bar may be swung by power about said axis at different predetermined speeds, power driven means, wholly carried on said truck and automatically operative when once connected to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction, and truck wheel driving mechanism operatively connectible at will to said power driven means to propel said truck longitudinally of a trackway at a substantially higher transport speed.

173. Mining apparatus including a wheeled truck movable over a trackway, mining mechanism thereon having a motor and an elongated cutter chain carrying cutter bar driven thereby, means whereby said bar is supportable on said truck with its cutting extremity free to swing across the front end of said truck about a fixed axis or held against swinging with said bar at acute angles to a trackway and on either side of the latter, variable speed transmission means driven by the same motor whereby during cutting said bar may be swung by power about said pivot at different predetermined speeds, power driven means driven by the same motor, wholly carried on said truck and automatically operative when once connected to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction, and truck wheel driving mechanism operatively connectible at will to said motor to propel said truck longitudinally of a trackway at a substantially higher transport speed.

174. Mining apparatus including a wheeled truck movable over a trackway, mining mechanism thereon having an elongated cutter chain carrying cutter bar, means whereby said bar is supported on said truck with its cutting extremity free to swing across the front end of said truck or held against swinging with said bar at acute angles to a trackway and on either side of the latter, a single source of power comprised in said mining mechanism and driving said chain, and change speed gearing driven from said source of power and controlling the movements of the cutter bar, said gearing including means for swinging said cutter bar at predetermined cutting speed in one direction and at higher return speed in the opposite direction and separately controlled connections, operating wholly within said mechanism, for moving the cutter bar translatively in the direction of the trackway with said bar in any position within its range of swing.

175. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprised in said mining mechanism, means for driving the cutter chain from said source of power, and change speed gearing driven from said source of power including a variable speed transmission comprising only gear elements and connecting the cutter bar to the source of power and operable to swing said cutter bar on its axis at a constant predetermined cutting speed in one direction and at a constant higher return speed in the opposite direction.

176. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, a variable speed transmission connecting the power shaft of said motor to the cutter bar and operable to swing said bar on its axis, and an independent transmission for connecting said motor and the truck wheels.

177. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, a power shaft extending from said motor towards the axis of said cutter bar, a variable speed transmission connecting the end of said shaft to the cutter bar and operable to swing said bar on its axis, and an independent transmission for connecting the said end of the power shaft to the truck wheels.

178. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, a reversible variable speed transmission connecting the power shaft of said motor to the cutter bar and operable to swing same on its axis in either direction at different speeds, and an independent transmission for connecting said motor to the truck wheels.

179. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, a power shaft extending from said motor towards the axis of said cutter bar, a reversible variable speed transmission connecting the end of said shaft to the cutter bar and operable to swing said bar on its axis in either direction at different speeds, and an independent transmission for connecting the said end of the power shaft to the truck wheels.

180. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, a reversible friction drive and variable speed transmission gearing connecting said motor to the cutter bar for swinging it on its axis in opposite directions at different speeds, and an independent transmission for connecting said motor to the truck wheels.

181. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, means for raising and lowering the cutter bar while maintaining it in horizontal position, a single source of power comprised in said mining mechanism, means for driving the cutter chain therefrom, and yieldable transmission means wholly supported on said truck throughout cutting for effecting bar swing and rectilinear feed during cutting including variable speed gearing connecting the source of power to the cutter bar.

182. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, means for raising and lowering the cutter bar while maintaining it in horizontal position, a single source of power for actuating said mining mechanism comprising a motor carried by the mining mechanism and located wholly at the rear of the axis of movement of the cutter bar, means for driving the cutter chain therefrom, variable speed transmission means between said motor and the cutter bar for swinging it on its axis in opposite directions at different predetermined speeds, and yielding means included in said transmission permitting slippage when the cutter bar meets obstruction.

183. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, means for raising and lowering the cutter bar while maintaining it in horizontal position, a single source of power for actuating said mining mechanism comprising a motor carried by the mining mechanism and located wholly at the rear of the axis of movement of the cutter bar, a drive shaft projecting from said motor towards the axis of swing of said cutter bar, means for driving the cutter chain from said shaft, variable speed transmission means connecting said shaft to the cutter bar for swinging same on its axis including a reversible friction drive, and an auxiliary transmission between said shaft and the truck wheels.

184. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, a single source of power embodied in said mechanism comprising a motor carried by said mining mechanism and located wholly at the rear of the axis of movement of the cutter bar and with its drive shaft directed towards said axis, and transmission mechanisms for connecting said motor to the cutter chain, bar and truck wheels respectively, all said transmission mechanisms being located between the axis of the cutter bar and the end of the motor remote from the latter and including means for varying the rate of swing of the cutter bar.

185. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, a single source of power embodied in said mechanism comprising a motor carried by said mining mechanism and located wholly at the rear of the axis of movement of the cutter bar and with its drive shaft directed towards said axis, and transmission mechanisms for connecting said motor to said cutter chain, bar, and truck wheels respectively, all said transmission mechanisms being located between the cutter bar axis and the end of the motor farther therefrom.

186. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, a single source of power embodied in said mechanism comprising a motor carried by said mining mechanism and located wholly at the rear of the axis of movement of the cutter bar and with its drive shaft directed towards said axis, and transmission mechanisms for connecting said motor to the cutter chain and bar respectively including variable speed gearing including different elements at different speeds for varying the rate of swing of the cutter bar, said transmission mechanisms being located between the cutter bar axis and the end of the motor nearest thereto.

187. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, said motor having a power shaft whose axis of rotation remains stationary during swinging of said cutter bar, a variable speed transmission connecting the power shaft of said motor to the cutter bar and operable to swing said bar on its axis, and an independent transmission for connecting said motor and the truck wheels.

188. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, said motor having a power shaft whose axis of rotation remains stationary during swinging of said cutter bar, the power shaft extending from said motor towards the axis of said cutter bar, a variable speed transmission connecting the end of said shaft to the cutter bar and operable to swing said bar on its axis, and an independent transmission for connecting the said end of said power shaft to the truck wheels.

189. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, said motor having a power shaft whose axis of rotation remains stationary during swinging of said cutter bar, a reversible variable speed transmission connecting the power shaft of said motor to the cutter bar and operable to swing same on its axis in either direction at different speeds, and an independent transmission for connecting said motor to the truck wheels.

190. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, said motor having a power shaft whose axis of rotation remains stationary during swinging of said cutter bar, the power shaft extending from said motor towards the axis of said cutter bar, a reversible variable speed transmission connecting the end of said shaft to the cutter bar and operable to swing said bar on its axis in either direction at different speeds, and an independent transmission for connecting the said end of the power shaft to the truck wheels.

191. Mining apparatus including a wheeled truck movable over a trackway, mining mechanism thereon having an elongated cutter chain carrying cutter bar, means whereby said bar is supported on said mechanism with its cutting extremity free to swing across the front end of said truck about a vertical axis, means for raising and lowering the cutter bar while maintaining it in horizontal position, a single source of power comprising a motor included in said mining mechanism and located wholly at the rear of the axis of movement of the cutter bar, said motor having a power shaft whose axis of rotation remains stationary during swinging of said cutter bar, a reversible friction drive and variable speed transmission gearing connecting said motor to the cutter bar for swinging it on its axis in opposite directions at different speeds, and an independent transmission for connecting said motor to the truck wheels.

192. Mining apparatus including a wheeled truck movable over a trackway, mining mechanism thereon having an elongated cutter chain carrying cutter bar, means for supporting said bar on said mechanism with its cutting extremity free to swing across the front end of said truck about a vertical axis, means for raising and lowering the cutter bar while maintaining it in horizontal position, a single source of power for actuating said mining mechanism comprising a motor carried by the mining mechanism and located wholly at the rear of the axis of movement of the cutter bar, said motor having a power shaft whose axis of rotation remains stationary during swinging of said cutter bar, means for driving the cutter chain therefrom, variable speed transmission means between said motor and the cutter bar for swinging it on its axis in opposite directions at different predetermined speeds, and yielding means included in said transmission permitting slippage when the cutter bar meets obstruction.

193. In a mining machine, a truck having wheels adapted to engage a track, a supporting member mounted on said truck for angular movement about a vertical axis, cutting mechanism carried by said support and having vertical movement with respect thereto, means for changing the plane of operation of said cuttting mechanism including vertical racks on said supporting member and pinions cooperating with said racks, actuating means for said cutting mechanism including a motor supported on said truck and having a power shaft rotating on a fixed axis, and operative connections between said motor and said cutting mechanism, and means driven by said motor for effecting movement of said truck along said track including a terminal rotatable feeding element rotating on an axis in a transverse plane intermediate said cutting mechanism and said motor and actuated by the latter with a peripheral speed appropriate for cutting.

194. In a mining machine, a truck having wheels adapted to engage a track, a supporting member mounted on said truck for angular movement about a vertical axis, cutting mechanism carried by said support and having vertical movement with respect thereto, means for changing the plane of operation of said cutting mechanism including vertical racks on said supporting member and pinions cooperating with said racks and rotating on axes parallel to the track when said cutting mechanism lies midway between the sides of the latter, actuating means for said cutting mechanism including a motor supported on said truck and having a power shaft rotating on a fixed axis, and operative connections between said motor and said cutting mechanism, and means driven by said motor for effecting movement of said truck along said track including a terminal rotatable feeding element rotating on an axis in a transverse plane intermediate said cutting mechanism and said motor, and actuated by the latter with a peripheral speed appropriate for cutting, said feeding element being disposed at one side of the central longitudinal vertical plane of said machine.

195. In a mining apparatus, a wheeled truck movable on a trackway, cutter mechanism including a cutter bar disposable in fixed relation at acute angles to the trackway and pivotally mounted on said truck, and self-contained power operated means supported on said truck for moving the bar when so disposed rectilinearly relative to the trackway, relatively transversely in the same plane, and reversely rectilinearly to form a parallel ribbed kerf of a depth substantially equal to the length of the bar and in a face in front of the end of the trackway, said self-contained means comprising mechanism permitting the effecting of movements corresponding to each of said movements at a speed in excess of the maximum cutting speed of said machine, all of said movements being at predetermined speeds.

196. In a mining apparatus, a wheeled truck movable on a trackway, cutter mechanism thereon comprising a motor and a pivotally mounted cutter chain-carrying cutter bar, and self-contained power operated mechanism supported by said truck for moving said bar either angularly across the end of said truck or longitudinally relative to said trackway at a feeding speed to cut either a right angle or a parallel face, and for effecting similar movements at a higher speed above the cutting capacity of the mechanism under normal working conditions, said power operated mechanism comprising elements adapted to cooperate to effect all of said movements specified at predetermined speeds.

197. In a mining apparatus, a wheeled truck movable on a trackway, cutter mechanism thereon comprising a motor and a pivotally mounted cutter chain-carrying-cutter bar adapted to swing in front of and across the end of the truck, mechanism solely supported by said truck for moving said bar angularly relative to said trackway to make a swinging cut extending across the end of the trackway in a face in advance of the latter, and power operated means solely supported by said truck for feeding said bar longitudinally of the trackway and transporting the same thereover at different predetermined speeds in each direction.

198. In a mining apparatus, supporting means movable on a trackway, cutter mechanism thereon comprising a pivotally mounted cutter bar having a chain adapted to cut a kerf for said bar in a face when said bar is presented edgewise thereto, and self-contained power operated means for moving said bar bodily rectilinearly of the trackway, about its pivot in the same plane, and reversely rectilinearly of the trackway to insert a parallel ribbed kerf in a face in front of the end of the trackway, said self-contained means comprising mechanism permitting the effecting of movements corresponding to each of said movements at a speed in excess of the maximum cutting speed of said machine, all of said movements being at predetermined speeds.

199. In a mining apparatus, supporting means movable on a trackway, cutter mechanism thereon comprising a pivotally mounted cutter bar having a chain adapted to cut a kerf for said bar in a face when said bar is presented edgewise thereto, and self-contained power operated means for moving said bar bodily rectilinearly of the trackway, about its pivot in the same plane, and reversely rectilinearly of the trackway to insert a horizontal parallel ribbed kerf in a face in front of the end of the trackway, said self-contained means comprising mechanism permitting the effecting of movements corresponding to each of said movements at a speed in excess of the maximum cutting speed of said machine, all of said movements being at predetermined speeds.

200. In a mining apparatus, a wheeled truck movable on a trackway, cutter mechanism thereon comprising a motor and a pivotally mounted cutter chain carrying cutter bar adapted to swing in front of and across the end of the truck, and self-contained power operated mechanism supported solely by said truck for moving said bar angularly relative to said trackway and reversely longitudinally relative thereto during cutting and also at a speed in excess of the maximum potential cutting speed of said mechanism under normal working conditions, all of said movements being at predetermined speeds.

201. In a mining apparatus, a wheeled truck movable on a trackway, cutter mechanism including a cutter bar disposable in fixed relation at acute angles to the trackway and pivotally mounted on said truck, and self-contained power operated means supported on said truck for moving the bar when so disposed rectilinearly relative to the trackway, relatively transversely in the same plane, and reversely rectilinearly to form a parallel ribbed horizontal kerf of a depth substantially equal to the length of the bar and in a face in front of the end of the trackway, said self-contained means comprising mechanism permitting the effecting of movements corresponding to each of said movements at a speed in excess of the maximum cutting speed of said machine, all of said movements being at predetermined speeds.

202. Mining apparatus including a wheeled truck movable over a trackway, mining mechanism thereon having an elongated cutter chain carrying cutter bar, means whereby said bar is supportable on said truck with its cutting extremity free to swing across the front end of said truck about a fixed axis in rear of the front end of the truck or held against swinging with said bar at acute angles to a trackway and on either side of the latter, change speed gearing whereby said bar may be swung by power about said axis in opposite directions at different predetermined speeds, and power driven means, wholly carried on said truck and automatically operative when once connected to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction.

203. Mining apparatus including a wheeled truck movable over a trackway, mining mechanism thereon having an elongated cutter chain carrying cutter bar, means whereby said bar is supportable on said truck with its cutting extremity free to swing across the front end of said truck about a fixed axis in rear of the front end of the truck or held against swinging with said bar at acute angles to a trackway and on either side of the latter, change speed gearing whereby during cutting said bar may be swung by power about said pivot at different predetermined speeds, and power driven means wholly carried on said truck and automatically operative, when once connected, to feed in a given direction, including connections for feeding said bar translatively when in opposite acute angled positions, at a predetermined rate of feed adapted to cutting whereby said bar is moved bodily longitudinally of the trackway in opposite directions while said cutter chain rotates in one direction, and supplemental connections for moving said truck bodily longitudinally of a trackway at a substantially higher transport speed 204. In a mining machine, a truck having wheels adapted to engage a track, a supporting member mounted on said truck for angular movement about a vertical axis, cutting mechanism carried by said supporting member and having vertical movement with respect thereto, and actuating means for said cutting mechanism including a motor symmetrically disposed with respect to the sides of said truck and having a power shaft rotating on a fixed longitudinal axis, said longitudinal axis and said vertical axis being in the same longitudinal vertical plane, and operative connections between said motor and said cutting mechanism.

205. Mining apparatus including a frame movable relative to the working face during cutting, a motor having a power shaft disposed longitudinally of said frame and stationary save for rotation on its own axis with respect thereto, a pivoted cutter bar, means for supporting said bar on said frame for adjustment while the axis of pivotal movement of said bar remains constantly parallel to the same straight line bodily toward and from and into a plane perpendicular to said straight line and including the axis of said shaft, and means driven from said shaft for actuating said bar and swinging the latter and for propelling said frame relative to the face in opposite directions during cutting.

206. Mining apparatus including a frame movable relative to a working face during cutting, a motor having a power shaft disposed longitudinally of said frame and stationary save for rotation on its own axis with respect thereto, a pivoted cutter bar, supporting means for said bar on said frame permitting bodily adjustment thereof into different positions in which said bar may swing in different parallel planes while the pivot of said bar remains parallel to the same straight line, and means driven from said shaft for actuating said bar and swinging the latter and for propelling said frame relative to the face in opposite directions during cutting.

207. In a mining apparatus, a wheeled truck movable on a trackway, cutter mechanism including a cutter chain carrying cutter bar disposable in fixed relation at acute angles to the trackway and being pivotable relative to said truck, self-contained power operated means supported on said truck for moving the bar rectilinearly relative to the trackway when positioned at an angle to the direction of said trackway, swinging said bar transversely in the same plane, and moving said bar reversely rectilinearly when positioned at an angle to the direction of the trackway at the opposite side of the center of the latter from its position during forward feed, to form a parallel ribbed horizontal kerf of a depth substantially equal to the length of the bar in a face in front of the trackway, said power operated means comprising a motor disposed horizontally and having its power shaft parallel to the direction of rectilinear feed, and means for adjusting the plane of operation of said bar to permit cutting in substantially horizontal planes below the axis of the power shaft of said motor and above said axis.

208. In a mining apparatus, a wheeled truck movable on a trackway, cutter mechanism including a cutter chain carrying cutter bar disposable in fixed relation at acute angles to the trackway and being pivotable relative to said truck, self-contained power operated means supported on said truck for moving the bar rectilinearly relative to the trackway when positioned at an angle to the direction of said trackway, swinging said bar transversely in the same plane, and moving said bar reversely rectilinearly when positioned at an angle to the direction of the trackway at the opposite side of the center of the latter from its position during forward feed, to form a parallel ribbed horizontal kerf of a depth substantially equal to the length of the bar in a face in front of the trackway, said power operated means comprising a motor disposed horizontally and having its power shaft parallel to the direction of rectilinear feed, and means for adjusting the plane of operation of said bar to permit cutting in substantially horizontal planes below the axis of the power shaft of said motor, above said axis and in the plane of said axis, including means for adjusting said bar from a position above said axis to a position below said axis while maintaining the plane of said bar at all times parallel to the same horizontal plane.

209. In a mining apparatus, supporting means movable on a trackway, cutter mechanism thereon comprising a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, and for transporting said mechanism as a whole from one working place to another at a transport speed, including a motor, transport mechanism driven thereby, and means for effecting the opposite rectilinear cutting movements driven independently of said transport mechanism and including reversing mechanism.

210. In a mining apparatus, supporting means movable on a trackway, cutter mechanism thereon comprising a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, and for transporting said mechanism as a whole from one working place to another at a transport speed, including motor operated transport mechanism reversible only by reversal of its driving motor, and motor operated mechanism including reversing means providing for the effecting of the opposite rectilinear cutting movements of the cutter bar with its driving motor rotating in the same direction during each of said rectilinear cutting movements.

211. In a mining apparatus, supporting means movable on a trackway, cutter mechanism thereon comprising a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, and for transporting said mechanism as a whole from one working place to another at a transport speed, including motor operated transport mechanism reversible only by reversal of its driving motor, and motor operated bar swinging mechanism for effecting bar swing in opposite directions including means for transmitting pivotal movement to the bar in opposite directions without reversal of the motor supplying the power for said movements.

212. In a mining apparatus, supporting means movable on a trackway, cutter mechanism thereon comprising a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, and for transporting said mechanism as a whole from one working place to another at a transport speed, including motor operated transport mechanism reversible only by reversal of its driving motor, and motor operated mechanism including power transmission devices including reversing mechanism, for providing for the effecting of bar swing in either direction or rectilinear cutting feed in either direction independently of reversal of the motor supplying power for said movements.

213. In a mining apparatus, supporting means movable on a trackway, cutter mechanism thereon comprising a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, and to transport said mechanism as a whole from one working place to another at a transport speed, including a motor, transport mechanism driven thereby, and means for effecting the opposite rectilinear cutting movements driven independently of said transport mechanism and including reversing mechanism through which pivotal movement of the cutter bar in opposite directions may also be effected.

214. In a mining apparatus, supporting means movable on a trackway, cutter mechanism thereon including a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, including reversing mechanism comprising oppositely rotatable gears arranged on an axis in a transversely extending plane, and a driving motor therefor, and means for effecting transport of said apparatus from one working place to another at a transport speed including driving mechanism driven by said motor and having a driving element nearer said motor than said reverse mechanism.

215. In a mining apparatus, supporting means movable on a trackway, cutter mechanism thereon including a pivotally mounted cutter bar, and self-contained power operated means for moving said bar bodily rectilinearly of the trackway, about its pivot in the same plane, and reversely rectilinearly of the trackway to insert a parallel-ribbed kerf in a face in front of the end of the trackway, said mechanism including bar swinging devices including reversing mechanism and a driving motor therefor having a driving element transmitting power to operate said mechanism, and means for effecting transport of said apparatus from one working place to another at a transport speed including gearing driven by said motor and having an initial driving element carried by said motor further from the face than said first mentioned driving element.

216. In a mining apparatus, supporting means movable on a trackway, cutter mechanism thereon including a pivotally mounted cutter bar, and self-contained power operated means for moving said bar bodily rectilinearly of the trackway, about its pivot in the same plane, and reversely rectilinearly of the trackway, to insert a parallel-ribbed kerf in a face in front of the end of the trackway, including reversing mechanism comprising oppositely rotatable gears arranged on an axis in a transversely extending plane, and a driving motor therefor, and means for effecting transport of said mechanism from one working place to another at a transport speed including driving mechanism driven by said motor and having a driving element nearer said motor than said reverse mechanism, the drive for said reversing mechanism including a driving element coaxial with the driving element for said transport mechanism.

217. In a mining apparatus, supporting means movable on a trackway, cutter mechanism thereon comprising a pivotally mounted cutter bar and self-contained power operated means for moving said bar bodily rectilinearly of the trackway, about its pivot in the same plane, and reversely rectilinearly of the trackway to insert a parallel-ribbed kerf in a face in front of the end of the trackway, and for transporting said apparatus from one working place to another at a substantially higher speed including a motor having a driving element operative to transmit power for transport, and a separate driving element through which power is transmitted to effect swinging of the bar.

218. In a mining apparatus, supporting means movable on a trackway, cutter mechanism thereon comprising a pivotally mounted cutter bar and self-contained power operated means for moving said bar bodily rectilinearly of the trackway, about its pivot in the same plane, and reversely rectilinearly of the trackway to insert a parallel-ribbed kerf in a face in front of the end of the trackway, and for transporting said apparatus from one working place to another at a substantially higher speed, including a motor having a driving element operative to transmit power for transport, and a separate driving element through which power is transmitted to effect opposite rectilinear cutting feeds.

219. In a mining apparatus, supporting means movable on a trackway, cutter mechanism thereon comprising a pivotally mounted cutter bar, and self-contained power operated means for moving said bar bodily rectilinearly of the trackway, about its pivot in the same plane and reversely rectilinearly of the trackway to insert a parallel-ribbed kerf in a face in front of the end of the trackway, and for transporting said apparatus from one working place to another at a substantially higher speed, including a motor having a driving element operative to transmit power for transport, and a separate driving element through which power is transmitted to effect opposite rectilinear cutting feeds and swinging of the bar.

220. In a mining apparatus, supporting means movable on a trackway, cutter mechanism thereon comprising a pivotally mounted cutter bar, and self-contained power operated means for moving said bar bodily rectilinearly of the trackway, about its pivot in the same plane and reversely rectilinearly of the trackway to insert a parallel-ribbed kerf in a face in front of the end of the trackway, and for transporting said apparatus from one working place to another at a substantially higher speed, including gearing for providing movement at a rate suitable for transport and gearing for providing movement at a rate suitable for cutting, said gearings having initial motor driving gear elements rotating on axes parallel to the same straight line.

221. In a mining apparatus, supporting means movable on a trackway, cutter mechanism thereon comprising a pivotally mounted cutter bar, and self-contained power operated means for moving said bar bodily rectilinearly of the trackway, about its pivot in the same plane and reversely rectilinearly of the trackway to insert a parallel ribbed kerf in a face in front of the end of the trackway, and for transporting said apparatus from one working place to another at a substantially higher speed, including gearing for providing movement at a rate suitable for transport and gearing for providing movement at a rate suited for swinging the bar during cutting, said gearings having initial motor driven driving gear elements rotating on axes parallel to the same straight line.

222. In a mining apparatus, supporting means movable on a trackway, cutter mechanism thereon comprising a pivotally mounted cutter bar, and self-contained power operated means for moving said bar bodily rectilinearly of the trackway, about its pivot in the same plane and reversely rectilinearly of the trackway to insert a parallel ribbed kerf in a face in front of the end of the trackway, and for transporting said apparatus from one working place to another at a substantially higher speed, including gearing for transmitting power for the several cutting movements of the bar and gearing for transmitting power for transport, said gearings having initial motor driven gear elements rotating on axes parallel to the same straight line.

223. In a mining apparatus, a motor, cutting mechanism actuated thereby and adjustable into a plurality of different planes for cutting, transmission mechanism connecting said motor with said cutting mechanism operative to effect drive of the latter irrespective of its plane of operation, clutch means for interrupting at will the drive of said cutting mechanism by said motor, and means permitting adjustment of said cutting mechanism from one plane to another parallel plane and for supporting it in its different adjusted positions operative to effect such adjustment irrespective of whether or not the said clutch means is operative to transmit power to the cutting mechanism.

224. In a mining apparatus, a wheeled support adapted to run along a mine trackway, kerf cutting mechanism mounted on said support including a pivoted cutter bar swingable horizontally relative to said support from a position with its free extremity at one side of the trackway to a position with its free extremity at the other side of the trackway to cut a transverse kerf in a face in advance of the trackway, a motor on said support, said motor remaining stationary with respect to said support during bar swing, mechanism driven by said motor for driving said cutting mechanism, mechanism driven by said motor for effecting swinging of said cutter bar at a relatively slow cutting speed relative to said support, and self-contained mechanism driven by said motor for feeding said cutter bar rectilinearly at a relatively slow cutting speed relative to the trackway on which said support is guided for effecting horizontal sumping and withdrawal movements of said cutter bar.

225. In a mining apparatus, a wheeled support adapted to run along a mine trackway, kerf cutting mechanism mounted on said support including a pivoted cutter bar swingable horizontally relative to said support from a position with its free extremity at one side of the trackway to a position with its free extremity at the other side of the trackway to cut a transverse kerf in a face in advance of the trackway, a motor on said support, said motor remaining stationary with respect to said support during bar swing, mechanism driven by said motor for driving said cutting mechanism, mechanism driven by said motor for effecting swinging of said cutter bar at a relatively slow cutting speed relative to said support, mechanism driven by said motor for feeding said cutter bar rectilinearly at a relatively slow cutting speed relative to the trackway on which said support is guided for effecting horizontal sumping and withdrawal movements of said cutter bar, and mechanism driven by said motor for driving the support wheels to propel the apparatus along the mine trackway at a relatively high transport speed.

226. In a mining apparatus, a wheeled support adapted to run along a mine trackway, kerf cutting mechanism on said support including a pivoted cutter bar swingable horizontally relative to said support from a position with its free extremity at one side of the trackway to a position with its free extremity at the other side of the trackway to cut a transverse kerf in a face in advance of the trackway, a motor on said support, a power shaft driven by said motor, said shaft being horizontally disposed and extending longitudinally of said support, said motor remaining stationary with respect to said support during bar swing, mechanism for adjusting said cutter bar into different parallel planes toward and from the axial line of said power shaft, mechanism driven by said motor for driving said cutting mechanism, mechanism driven by said motor for effecting swinging movement of said cutter bar at a relatively slow cutting speed relative to said support, and mechanism driven by said motor for feeding said cutter bar rectilinearly at a relatively slow cutting speed relative to the trackway on which said support is guided for effecting sumping and withdrawal movements of said cutter bar.

227. In a mining apparatus, a wheeled support adapted to run along a mine trackway, kerf cutting mechanism on said support including a pivoted cutter bar swingable horizontally relative to said support from a position with its free extremity at one side of the trackway to a position with its free extremity at the other side of the trackway to cut a transverse kerf in a face in advance of the trackway, a motor on said support, a power shaft driven by said motor, said shaft being horizontally disposed and extending longitudinally of said support, said motor remaining stationary with respect to said support during bar swing, mechanism for adjusting said cutter bar into different parallel planes toward and from the axial line of said power shaft, mechanism driven by said motor for driving said cutting mechanism, mechanism driven by said motor for effecting swinging movement of said cutter bar at a relatively slow cutting speed relative to said support, mechanism driven by said motor for feeding said cutter bar rectilinearly at a relatively slow cutting speed relative to the trackway on which said support is guided for effecting sumping and withdrawal movements of said cutter bar, and mechanism driven by said motor for driving the support wheels to propel the apparatus along the mine trackway at a relatively high transport speed.

228. Mining apparatus including a truck movable along a trackway and having wheels supporting the same, a motor on said truck having a power shaft extending longitudinally of said truck, cutting mechanism supported by said truck forwardly of said motor and adapted to cut kerfs extending across the end of said trackway in advance of said wheels, means for effecting swinging movement of said cutting mechanism actuated by said motor, and means for propelling said truck including a vertical shaft, bevel gearing connecting said vertical shaft in driving relation with certain of said truck wheels, and driving connections between said vertical shaft and said motor.

229. Mining apparatus including a truck movable along a trackway and having wheels supporting the same, a motor on said truck having a power shaft extending longitudinally of said truck, cutting mechanism supported by said truck forwardly of said motor and adapted to cut kerfs extending across the end of said trackway in advance of said wheels, means for effecting swinging movement of said cutting mechanism and actuating the same actuated by said motor, and means for propelling said truck including a vertical shaft, bevel gearing connecting said vertical shaft in driving relation with certain of said truck wheels, and driving connections between said vertical shaft and said motor.

230. In a mining machine, a truck having wheels adapted to engage a track, a supporting member mounted on said truck for angular movement about a vertical axis, cutting mechanism carried by said support and having vertical movement with respect thereto, means for changing the plane of operation of said cutting mechanism including vertical racks on said supporting member and pinions cooperating with said racks, and actuating means for said cutting mechanism including a motor supported on said truck and having a power shaft rotating on a fixed longitudinal axis, and operative connections between said motor and said cutting mechanism.

231. In a mining machine, a truck having wheels adapted to engage a track, a supporting member mounted on said truck for angular movement about a vertical axis, cutting mechanism carried by said support and having vertical movement with respect thereto, means for changing the plane of operation of said cutting mechanism including vertical racks on said supporting member and pinions cooperating with said racks and rotating on axes parallel to the track when said cutting mechanism lies midway between the sides of the latter, and actuating means for said cutting mechanism including a motor supported on said truck and having a power shaft rotating on a fixed longitudinal axis, and operative connections between said motor and said cutting mechanism.

232. In a mining machine, a truck having wheels adapted to engage a track, a supporting member mounted on said truck for angular movement about a vertical axis, cutting mechanism carried by said supporting member and having vertical movement with respect thereto, actuating means for said cutting mechanism including a motor supported on said truck and having a power shaft rotating on a fixed longitudinal axis, and operative connections between said motor and said cutting mechanism, and means for effecting opposite longitudinal movements of said truck and the mechanism supported thereby at a cutting speed along said track during cutting.

233. Mining apparatus including a frame movable relative to a working face during cutting, running gear for said frame, a motor mounted directly on said frame, operative connections between said motor and said running gear whereby said frame may be propelled by said motor, a horizontally rotatable turntable on said frame, operative connections between said motor and said turntable for rotating the latter by power, cutting mechanism supported on said turntable vertically adjustable with respect thereto and swingable horizontally on rotation thereof, and means for effecting vertical adjustment of said cutting mechanism relative to said turntable including a power transmitting shaft rotatable to effect vertical elevation of said cutting mechanism and moving vertically therewith.

234. Mining apparatus including a frame movable relative to a working face during cutting, running gear for said frame, a motor mounted directly on said frame, operative connections between said motor and said running gear whereby said frame may be propelled by said motor, a horizontally rotatable turntable on said frame, operative connections between said motor and said turntable for rotating the latter by power, cutting mechanism on said turntable vertically adjustable with respect thereto and swingable horizontally on rotation thereof, and means for effecting vertical adjustment of said cutting mechanism relative to said turntable including a plurality of vertical racks on said turntable and rack traversing means cooperating therewith and vertically moving with said cutting mechanism.

235. Mining apparatus including a frame movable relative to a working face during cutting, running gear for said frame, a motor mounted directly on said frame, operative connections between said motor and said running gear whereby said frame may be propelled by said motor, a horizontally rotatable turntable on said frame, operative connections between said motor and said turntable for rotating the latter by power, cutting mechanism on said turntable vertically adjustable with respect thereto and swingable horizontally on rotation thereof, and means for effecting vertical adjustment of said cutting mechanism relative to said turntable including a plurality of vertical racks on said turntable, rack traversing means cooperating therewith and vertically moving with said cutting mechanism, said rack traversing means rotating on horizontal axes, and means for actuating said rack traversing means including a shaft rotating on an axis transverse to the axes of rotation of said rack traversing means.

236. Mining apparatus adapted to cut a kerf in a face and movable along guiding means extending towards the face to be cut including an elongated cutter chain carrying cutter bar, supporting means for said bar permitting pivotal movement thereof from positions with its cutting extremity at one side of said guide to positions with its extremity at the opposite side of said guide, bar controlling means operative to swing the same by power between such positions during cutting in advance of said guiding means, to lock the same in different angular positions and to permit free swinging thereof, and means for effecting feeding of said mechanism rectilinearly in opposite directions at a predetermined cutting speed with the cutter chain in each case circulating in the same direction, or for moving the same at a predetermined higher speed, said means being self-contained.

237. Mining apparatus for cutting by the making of sumping, swinging and withdrawal cuts including, in combination, an elongated, pivoted, cutter chain carrying cutter bar, supporting means for said bar permitting pivotal movement to positions adjacent either of the opposite sides of a face to be cut, bar controlling means operative to swing the same by power between such positions during cutting in advance of said guiding means, to lock the same in different angular positions, or to permit free swinging thereof, means for moving said bar to different parallel planes, and means, self-contained and power operated, for effecting rectilinear feed of the bar towards and into a face while in one angular relation to its direction of bodily movement during sumping and at the conclusion of a swinging cut for withdrawing it while in a different angular relation to its direction of bodily movement during sumping, at, during both of said movements, a cutting speed.

238. Mining apparatus for cutting by the making of sumping, swinging and withdrawal cuts including, in combination, an elongated, pivoted, cutter chain carrying cutter bar, supporting means for said bar permitting pivotal movement to positions adjacent either of the opposite sides of a face to be cut, bar controlling means operative to swing the same by power between such positions during cutting in advance of said guiding means, to lock the same in different angular positions, or to permit free swinging thereof, means for moving said bar to different parallel planes operative with said cutter chain idle, and means, self-contained and power operated, for effecting rectilinear feed of the bar towards and into a face while in an angular relation to its direction of bodily movement during sumping and for withdrawing it while in a different angular relation to its direction of bodily movement during sumping, at, during both of said movements, a cutting speed, and for transporting said apparatus at a higher transport speed.

239. In a mining apparatus, supporting means movable on a trackway, cutter mechanism thereon including a pivotally mounted cutter bar, and self-contained power operated means for moving said bar bodily rectilinearly of the trackway, about its pivot in the same plane, and reversely rectilinearly of the trackway to insert a parallel ribbed kerf in a face in front of the end of the trackway and for effecting transport from one working place to another at a higher speed including coaxial members rotating at equiangular rates, one transmitting drive for transport and the other transmitting power for effecting sumping and withdrawing movements, and reversible driving mechanism driven by said second mentioned member.

In testimony whereof, I have signed my name to this specification.

MORRIS P. HOLMES.

DISCLAIMER 1,769,878.—*Morris P. Holmes*, Claremont, N. H. MINING MACHINE. Patent dated July 1, 1930. Disclaimer filed June 15, 1940, by the assignee, *Sullivan Machinery Company*.

Hereby enters this disclaimer to claims 71, 72, 73, and 74 in said specification.
[*Official Gazette July 9, 1940.*]